US012739876B2

(12) United States Patent
Lee

(10) Patent No.: US 12,739,876 B2
(45) Date of Patent: Sep. 15, 2026

(54) METHOD, DEVICE, AND COMPUTER PROGRAM FOR SELECTING CHANNEL IN WIRELESS COMMUNICATION SYSTEM, AND RECORDING MEDIUM THEREFOR

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 449 days.

(21) Appl. No.: 17/996,495

(22) PCT Filed: Apr. 20, 2021

(86) PCT No.: PCT/KR2021/004910

§ 371 (c)(1),
(2) Date: Oct. 18, 2022

(87) PCT Pub. No.: WO2021/215776

PCT Pub. Date: Oct. 28, 2021

(65) Prior Publication Data

US 2023/0224958 A1 Jul. 13, 2023

(30) Foreign Application Priority Data

Apr. 20, 2020 (KR) ........................ 10-2020-0047573

(51) Int. Cl.
*H04W 74/0808* (2024.01)
*H04L 5/00* (2006.01)

(52) U.S. Cl.
CPC ....... *H04W 74/0808* (2013.01); *H04L 5/0012* (2013.01)

(58) Field of Classification Search
CPC . H04W 74/0808; H04W 8/005; H04W 72/02; H04W 72/40; H04W 72/542;
(Continued)

(56) References Cited

U.S. PATENT DOCUMENTS

2006/0013172 A1* 1/2006 Ruuska ................ H04B 1/7143 370/338
2006/0133543 A1 6/2006 Linsky et al.
(Continued)

FOREIGN PATENT DOCUMENTS

| | | | |
|---|---|---|---|
| CN | 101911749 | A | 12/2010 |
| CN | 107105386 | A | 8/2017 |
| KR | 10-2016-0104017 | A | 9/2016 |

OTHER PUBLICATIONS

International Search Report for PCT/KR2021/004910 by Korean Intellectual Property Office dated Aug. 6, 2021.
(Continued)

*Primary Examiner* — Kwang B Yao
*Assistant Examiner* — Syed M Bokhari
(74) *Attorney, Agent, or Firm* — BROADVIEW IP LAW, PC

(57) ABSTRACT

The present disclosure relates to a method, a device, and a computer program for selecting a channel in a wireless communication system, and to a recording medium therefor. The method for selecting a channel by a first device in a wireless communication system, according to one embodiment of the present disclosure, may comprise the steps of: receiving a channel categorization report from a second device; and determining a channel map on the basis of at least one of the channel categorization report, a channel sensing result of the first device, and information provided by a host of the first device.

10 Claims, 39 Drawing Sheets

(58) Field of Classification Search
CPC ....... H04W 76/14; H04W 4/80; H04W 24/10; H04L 5/0012; H04B 17/309; Y02D 30/70
USPC .......................................................... 370/329
See application file for complete search history.

(56) References Cited

U.S. PATENT DOCUMENTS

2007/0206660 A1* 9/2007 Lifchuk ................. H04B 1/715 375/132
2008/0219323 A1 9/2008 Desai et al.
2009/0111496 A1 4/2009 Ibrahim et al.
2010/0183049 A1* 7/2010 Brandt ................ H04M 1/6066 375/E1.033
2015/0327138 A1* 11/2015 Lee ....................... H04W 76/34 455/426.1
2016/0165429 A1 6/2016 Sen et al.
2016/0234833 A1* 8/2016 Shimezawa ........... H04W 72/21
2017/0245285 A1* 8/2017 Palin ................... H04W 72/542
2021/0250225 A1* 8/2021 Agarwal ............... H04L 1/1642

OTHER PUBLICATIONS

Mohamad, Omar Al Kalaa et al. Evaluating Bluetooth Low Energy in realistic wireless environments. In: 2016 IEEE Wireless Communications and Networking Conference. Sep. 15, 2016, E-ISSN: 1558-2612.

Extended European Search Report for EP 21792342.4 by European Patent Office dated Mar. 15, 2024.

Nikoukar Ali et al: "Low-Power Wireless for the Internet of Things: Standards and Applications", IEEE Access, vol. 6, Nov. 28, 2018 (Nov. 28, 2018) pp. 67893-67926, XP011697070, DOI: 10.1109/ACCESS.2018.2879189 [retrieved on Nov. 28, 2018].

Office Action for CN 202180036637.4 by China National Intellectual Property Administration dated May 13, 2025.

Takeda, Kazuaki, "Status Report of WI on New Radio Access Technology", 3GPP TSG RAN meeting #83, RP-190251, Mar. 2019.

Notice of Allowance for CN 202180036637.4 by China National Intellectual Property Administration Jun. 19, 2026.

* cited by examiner

FIG. 9

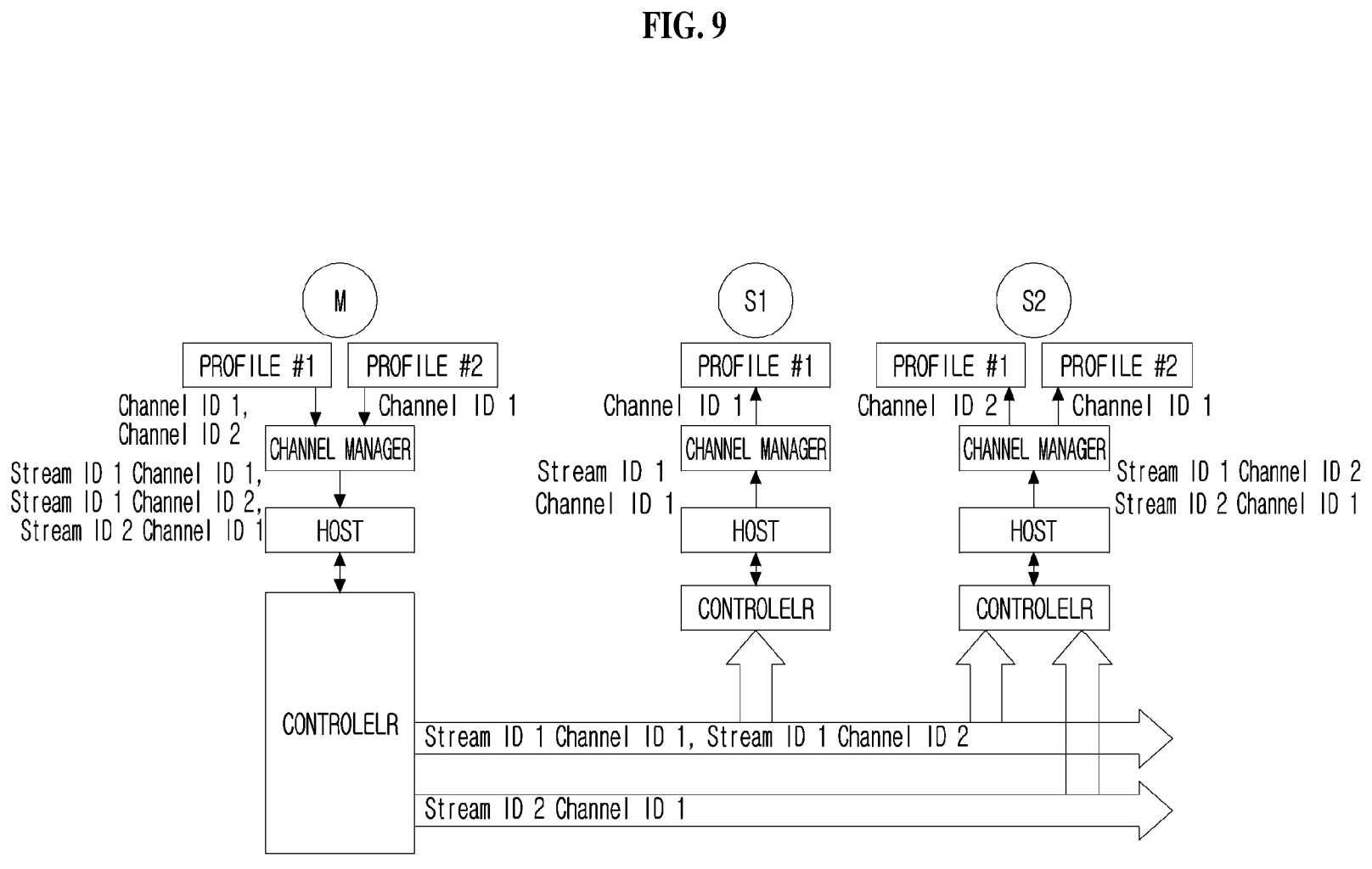

M
PROFILE #1
PROFILE #2
Channel ID 1, Channel ID 2
Channel ID 1
CHANNEL MANAGER
HOST
Stream ID 1 Channel ID 1, Stream ID 1 Channel ID 2, Stream ID 2 Channel ID 1
CONTROLELR
Stream ID 1 Channel ID 1, Stream ID 1 Channel ID 2
Stream ID 2 Channel ID 1

S1
PROFILE #1
Channel ID 1
CHANNEL MANAGER
HOST
Stream ID 1 Channel ID 1
CONTROLELR S2
PROFILE #1
PROFILE #2
Channel ID 2
Channel ID 1
CHANNEL MANAGER
HOST
Stream ID 1 Channel ID 2
Stream ID 2 Channel ID 1
CONTROLELR FIG. 15
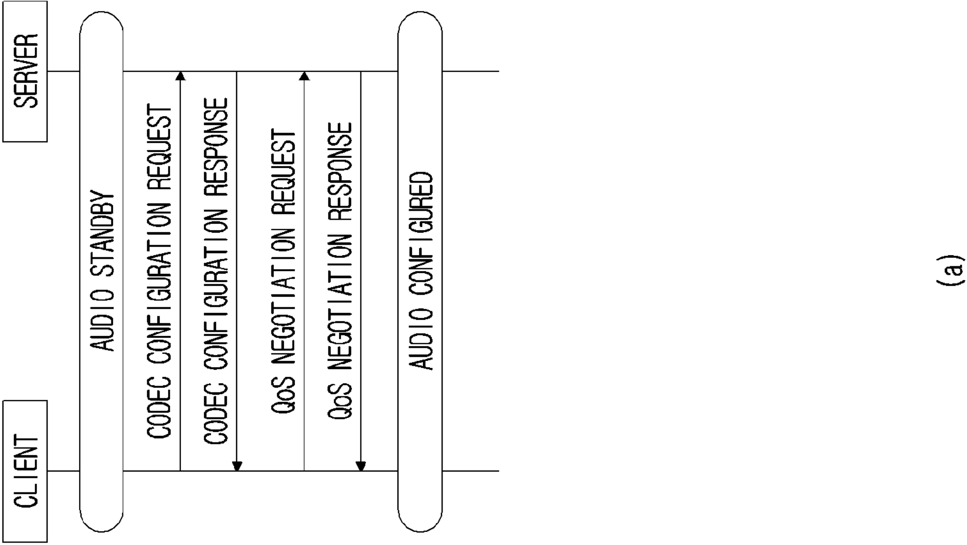
(a)
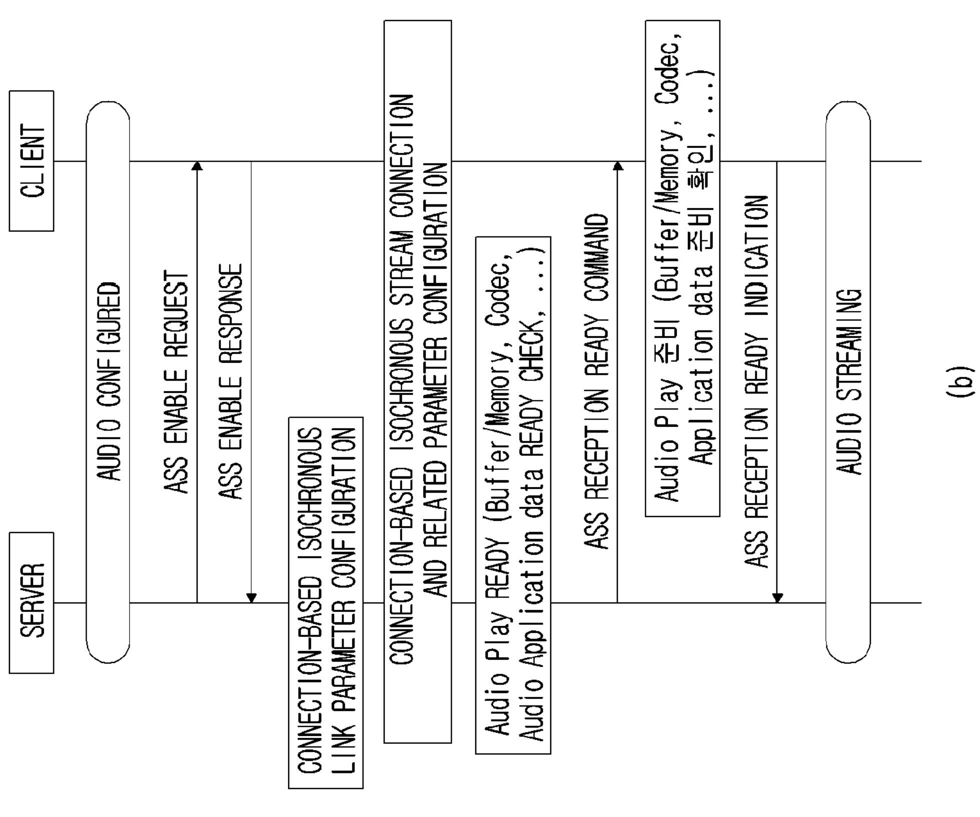
(b)

FIG. 16

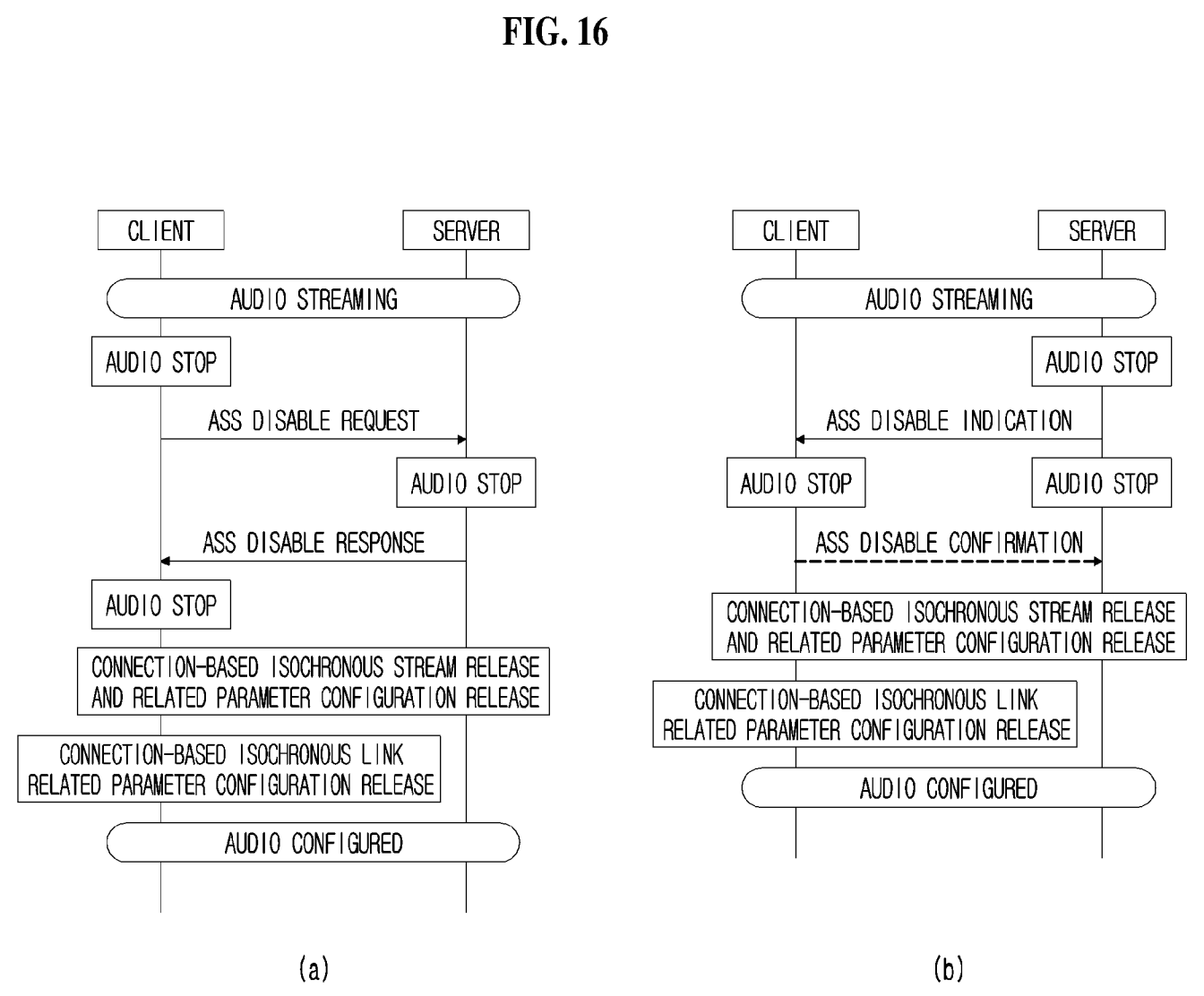

CLIENT
SERVER
AUDIO STREAMING
AUDIO STOP
ASS DISABLE REQUEST
AUDIO STOP
ASS DISABLE RESPONSE
AUDIO STOP
CONNECTION-BASED ISOCHRONOUS STREAM RELEASE AND RELATED PARAMETER CONFIGURATION RELEASE
CONNECTION-BASED ISOCHRONOUS LINK RELATED PARAMETER CONFIGURATION RELEASE
AUDIO CONFIGURED (a)

CLIENT
SERVER
AUDIO STREAMING
AUDIO STOP
ASS DISABLE INDICATION
AUDIO STOP
AUDIO STOP
ASS DISABLE CONFIRMATION
CONNECTION-BASED ISOCHRONOUS STREAM RELEASE AND RELATED PARAMETER CONFIGURATION RELEASE
CONNECTION-BASED ISOCHRONOUS LINK RELATED PARAMETER CONFIGURATION RELEASE
AUDIO CONFIGURED (b)

-Wi-Fi, ZigBee, Bluetooth abd BLE spectrum.

| EC index | Value |
|---|---|
| CQI 1 | 0 |
| CQI 2 | 0 |
| CQI 3 | 0 |
| CQI 4 | 0 |
| CQI 5 | 1 |
| CQI 6 | 1 |
| CQI 7 | 0 |
| ... | |
| CQI 13 | 0 |

| EC index | Value |
|---|---|
| CL1 | Used |
| CL2 | Used |
| CL3 | Unused |
| CL4 | Unused |
| CL5 | Unused |
| CL6 | Unused |
| CL7 | Unused |
| CL8 | Unused |
| CL9 | Used |
| CL10 | Used |
| ... | ... |
| CL39 | Used |
| CL40 | Used |

FIG. 33

User A
Key device #1
Application #1
DK Profile
User B
User C
Key device #2
Application #2
DK Profile
User D
Key device #3
Key device #4
Application #3
DK Profile
Application #4
Application #5
DK Profile
Unlocked
Car

| | |
|---|---|
| [7] | Token E for ID 0×01 |
| [6] | Token D for ID 0×01 |
| [5] | Token C for ID 0×01 |
| [4] | Token H for ID 0×33 |
| [3] | Token B for ID 0×01 |
| [2] | Token G for ID 0×33 |
| [1] | Token A for ID 0×01 |
| [0] | Token F for ID 0×33 |

Token Store

FIG. 35

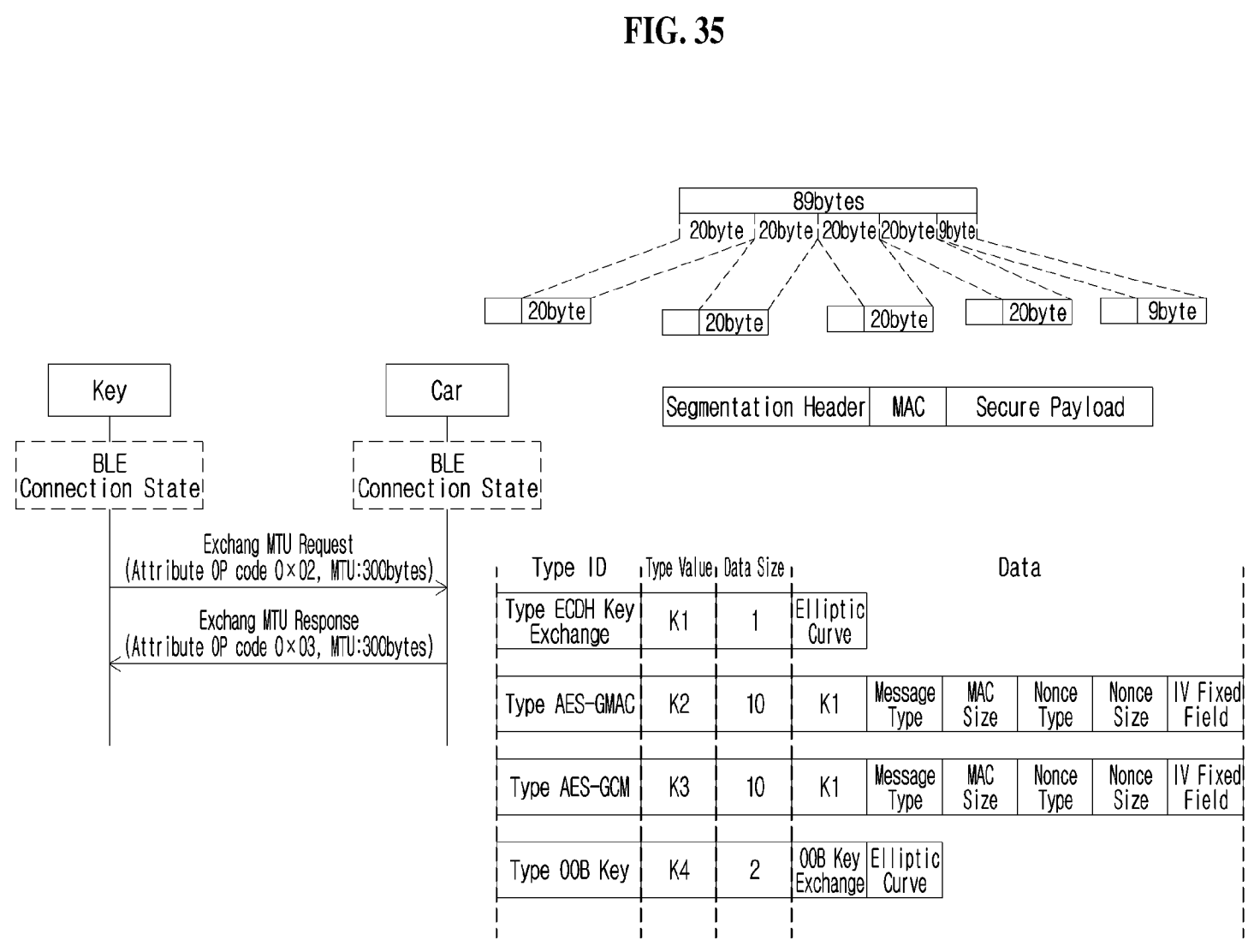

Key

BLE Connection State

Car

BLE Connection State

Exchang MTU Request (Attribute OP code 0×02, MTU:300bytes)

Exchang MTU Response (Attribute OP code 0×03, MTU:300bytes)

89bytes

20byte 20byte 20byte 20byte 9byte

20byte 20byte 20byte 20byte 9byte

| Segmentation Header | MAC | Secure Payload |
|---|---|---|

| Type ID | Type Value | Data Size | Data | | | | | |
|---|---|---|---|---|---|---|---|---|
| Type ECDH Key Exchange | K1 | 1 | Elliptic Curve | | | | | |
| Type AES-GMAC | K2 | 10 | K1 | Message Type | MAC Size | Nonce Type | Nonce Size | IV Fixed Field |
| Type AES-GCM | K3 | 10 | K1 | Message Type | MAC Size | Nonce Type | Nonce Size | IV Fixed Field |
| Type OOB Key | K4 | 2 | OOB Key Exchange | Elliptic Curve | | | | |

Authentication failure case

User A

Key

User A Car

User B Car

Hack

User Input

Authentication REQ

Authentication Action

User Check

Authentication response(Fail)

Authentication REQ

Authentication response(Fail)

User Check

Anomaly detection

Authentication Action

FIG. 38
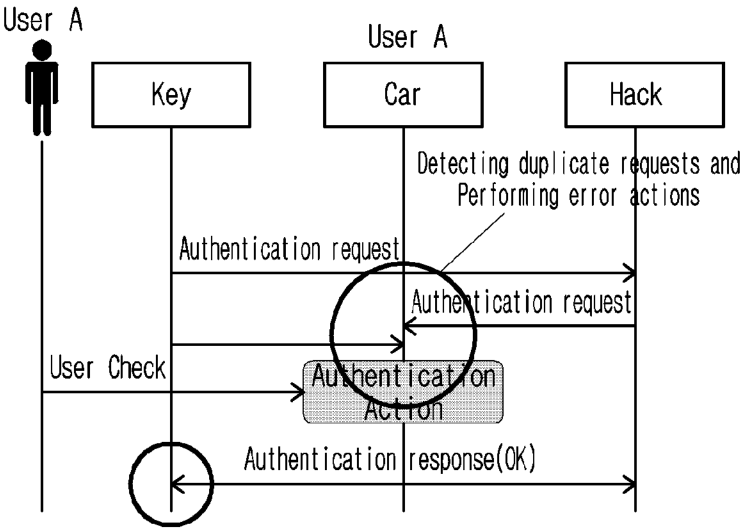
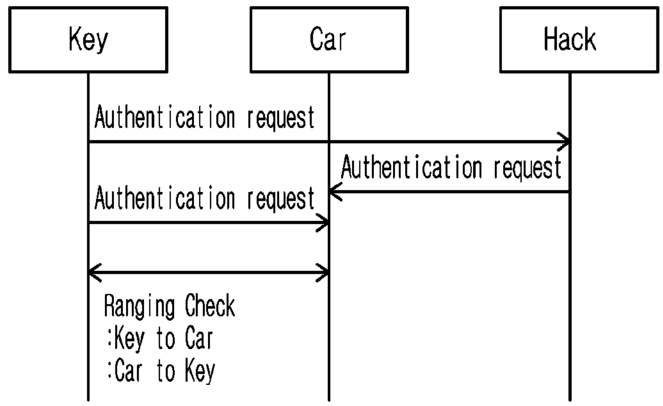

METHOD, DEVICE, AND COMPUTER PROGRAM FOR SELECTING CHANNEL IN WIRELESS COMMUNICATION SYSTEM, AND RECORDING MEDIUM THEREFOR

CROSS-REFERENCE TO RELATED APPLICATIONS

This application is a National Phase Entry Application of PCT Application No. PCT/KR2021/004910 filed on Apr. 20, 2021, which claims priority to Korean Patent Application No. 10-2020-0047573 filed on Apr. 20, 2020, in Korean Intellectual Property Office, the entire contents of which are hereby incorporated by reference in its entirety.

TECHNICAL FIELD

The present disclosure relates to a method, an apparatus, a computer program, and a recording medium thereof for selecting channel in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In the conventional Bluetooth system, there is no method for selecting a channel based on sharing and estimation of a channel state between different systems.

On the other hand, in the conventional Bluetooth system, there is no method for improving the authentication procedure to solve the digital key authentication error.

DISCLOSURE

Technical Problem

A technical problem of the present disclosure is to provide a method and apparatus for supporting channel selection in a wireless communication system.

An additional technical problem of the present disclosure is to provide a method and apparatus for solving a key authentication error in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method for a first device of a wireless communication system according to an aspect of the present disclosure to perform channel selection may include receiving a channel classification report from a second device; and determining a channel map based on at least one of the channel classification report, a channel sensing result of the first device, or information provided from the host of the first device.

The features briefly summarized above with respect to the present disclosure are merely exemplary aspects of the detailed description of the present disclosure that follows, and do not limit the scope of the present disclosure.

Technical Effects

According to the present disclosure, a method and apparatus for supporting channel selection in a wireless communication system may be provided.

According to the present disclosure, a method and apparatus for solving a key authentication error in a wireless communication system may be provided.

The technical effects of the present disclosure are not limited to the above-described effects, and other effects not mentioned herein may be understood to those skilled in the art from the following description.

BRIEF DESCRIPTION OF DRAWINGS

FIG. 8 and FIG. 9 are diagrams for describing the operation of the ICL type and the INCL type to which the present disclosure is applicable.

FIG. 14 to FIG. 16 are diagrams illustrating a message exchange process between a server and a client to which the present disclosure is applicable.

FIG. 33 is a diagram for describing an example of user registration and management to which the present disclosure may be applied.

FIG. 35 is a diagram for describing a digital key bearer establishment process to which the present disclosure may be applied.

FIG. 38 is a diagram for describing an authentication error solving method to which the present disclosure may be applied.

BEST MODE

Figure 1:
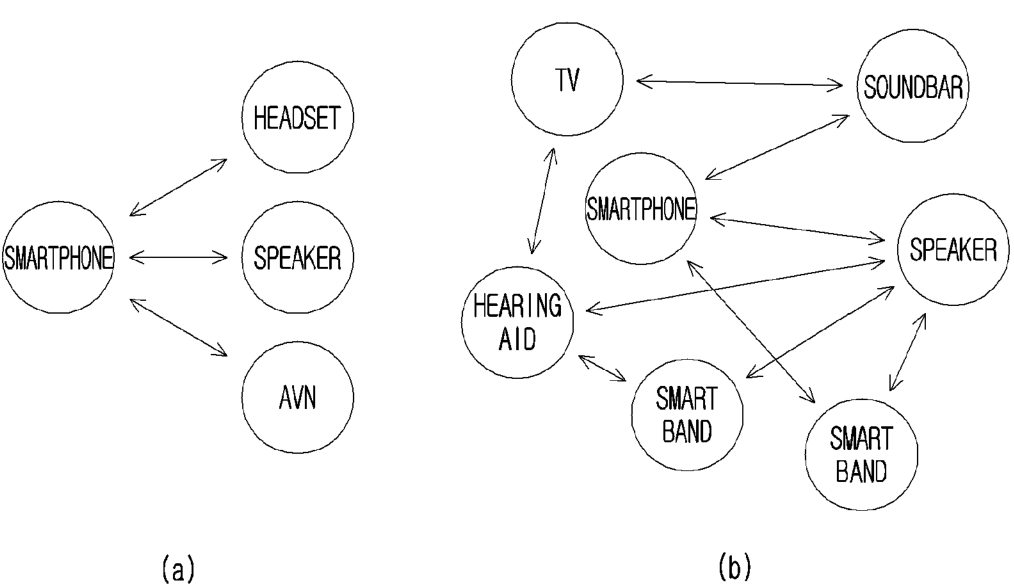
FIG. 1 is a diagram exemplarily illustrating a conventional audio connection type and an audio connection type to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(*a*) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(*b*) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figure 2:
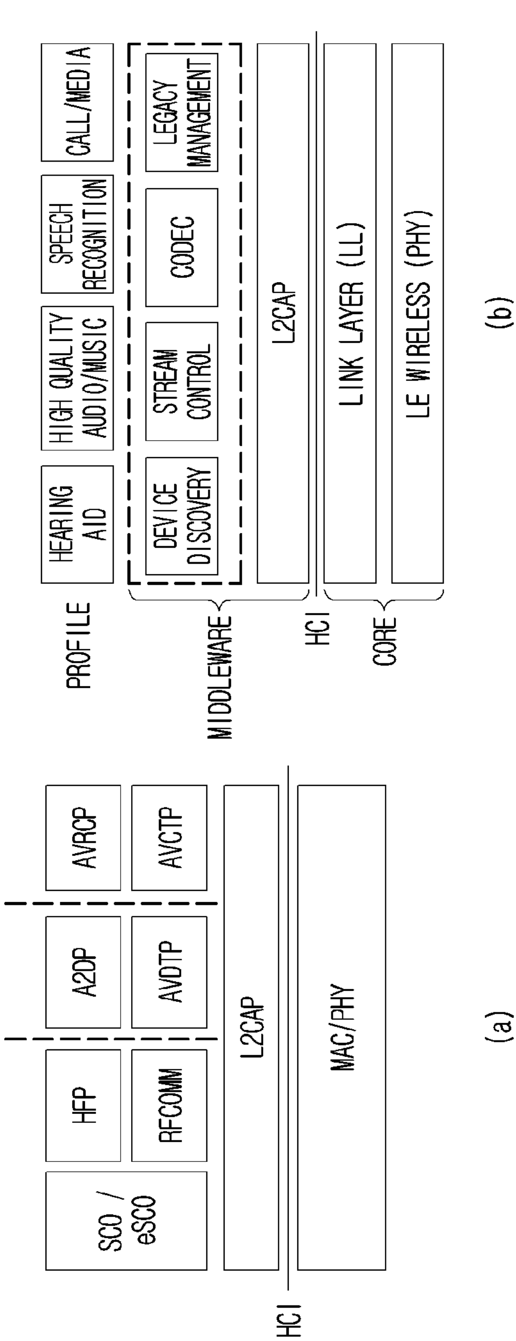
FIG. 2 is a diagram exemplarily illustrating a conventional audio-related protocol and an audio-related protocol stack to which the present is applicable.

FIG. 2 is a diagram exemplarily illustrating a conventional audio-related protocol stack and an audio-related protocol stack to which the present disclosure is applicable.

FIG. 2(*a*) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc, and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCl (Host Controller Interface).

FIG. 2(*b*) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCl may be defined between the host and the controller.

In addition to the host profile and protocol illustrated in FIG. 2(*b*), the host may include an LE profile, a generic access profile (GAP), a generic attribute profile (GATT), an Attribute (ATT) protocol, a security manager (SM), and the like.

Information transmitted from a host to a controller may be referred to as a HCl command packet. Information transmitted from a controller to a host may be referred to as a HCl event packet. In addition, HCl asynchronous data packets or HCl synchronous data packets may be exchanged between a host and a controller.

Also, in addition to the middleware profiles and services illustrated in FIG. 2(*b*), the middleware may include various profiles and/or services as follows:

- Audio Session Capability Service (ASCS): Audio Session Capability Service (ASCS) is a service that supports to advertise or discover capabilities related to an audio session;
- Audio Stream Session Service (Audio Stream Session Service, ASSS): Audio Stream Session Service (ASSS) is a service that supports discovery, setup, establishment, control, and management related to an audio session;
- Audio Input Management Service (AIMS): a service for managing audio input volume, etc.;
- Audio Routing Service (ARS): a service for selecting the location of audio inputs and outputs;
- Audio Middleware Profile (AMP): a basic profile for the behavior of a device to distribute audio;
- Call Management Profile (CMP): a profile of the roles and procedures of interaction between two devices for a call;
- Audio General Middleware Profile (AGMP): a basic profile that enables content and/or stream control;
- Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:
- Audio Player Management Profile (APMP): a profile that supports the control or interaction of an audio player;
- Audio Player Management Service (APMS): a service that supports the control or interaction of an audio player;
- Microphone Management Profile: a profile for microphone state management;
- Microphone Management Service: a service that supports interfaces and states for microphone state management;
- Quick Service Discovery Service (QSDS): a service that supports quick discovery of services such as audio player management and call management;
- Call Bearer Service: a service that supports management of a call interface and a call state for a bearer on a device;
- Volume Management Profile: a profile that supports audio volume management of a device;
- Volume Management Service: a service that supports the device's audio volume interface and state;
- Volume Offset Management Service: a service for volume management for audio output.

Figure 3:
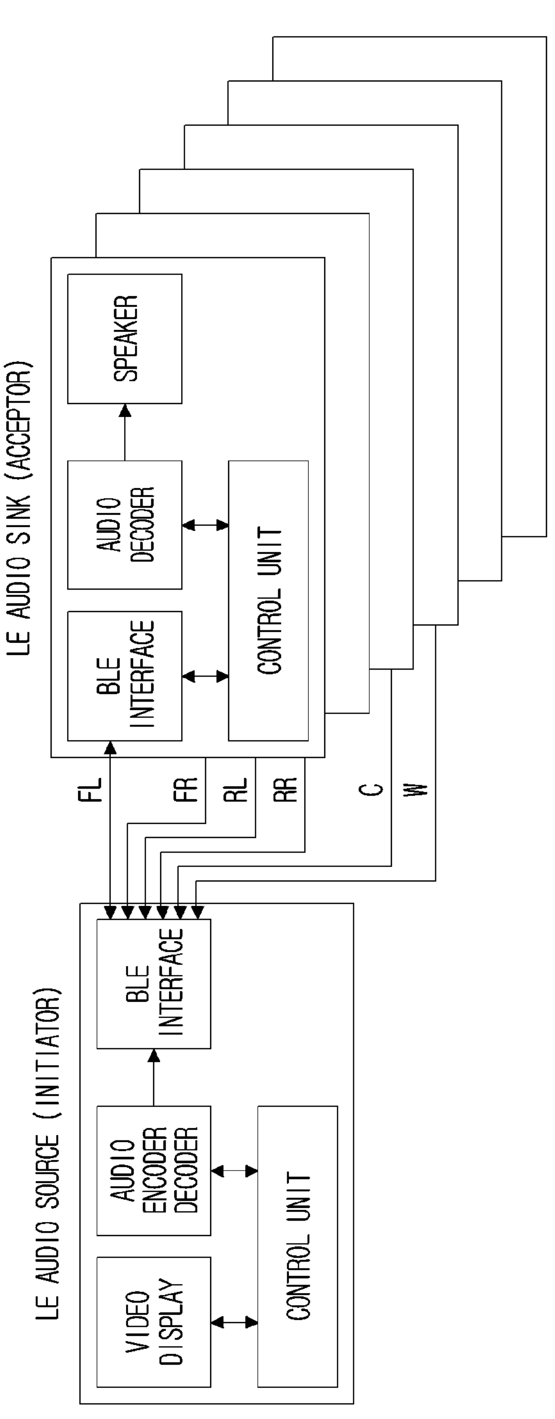
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
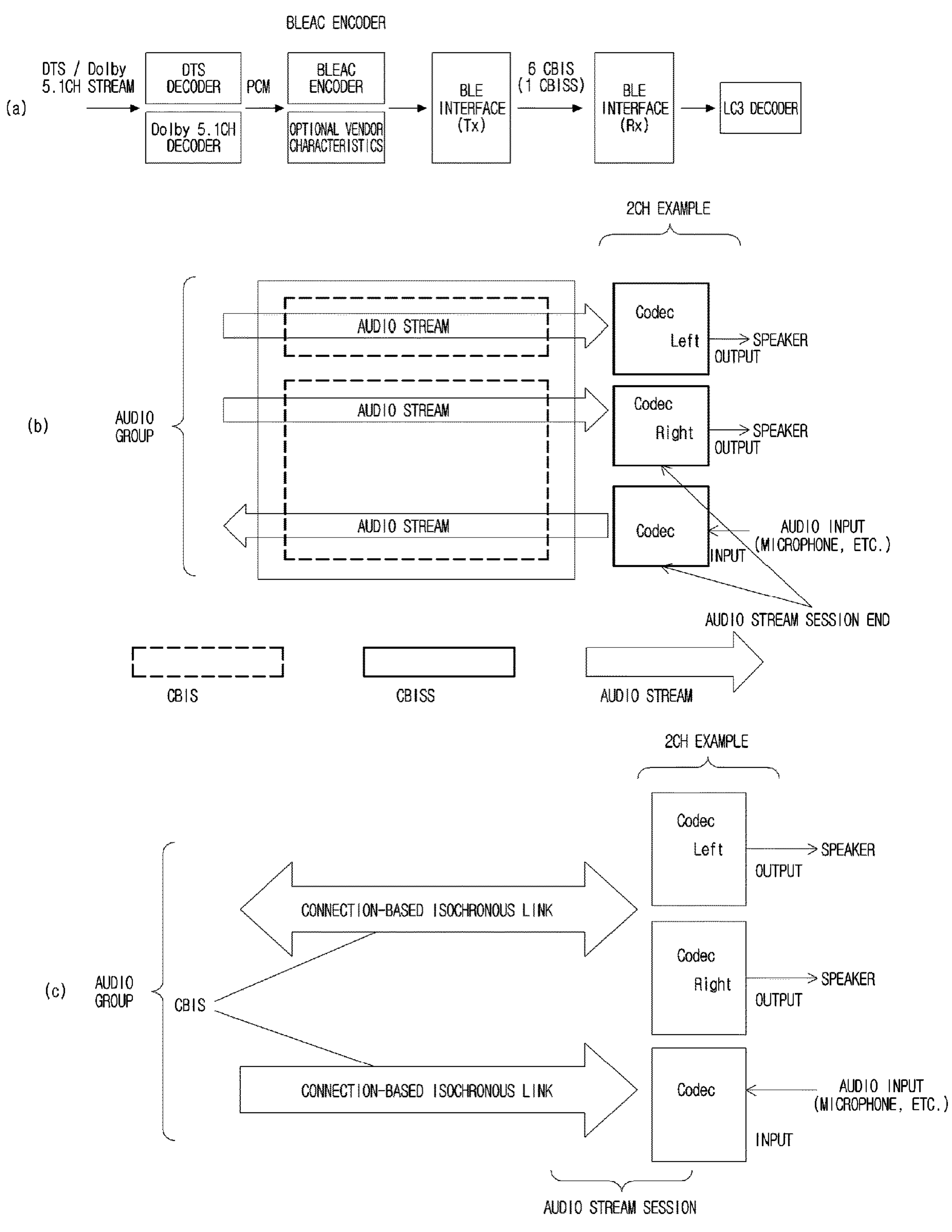
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(*a*), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(*b*) and 4(*c*) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
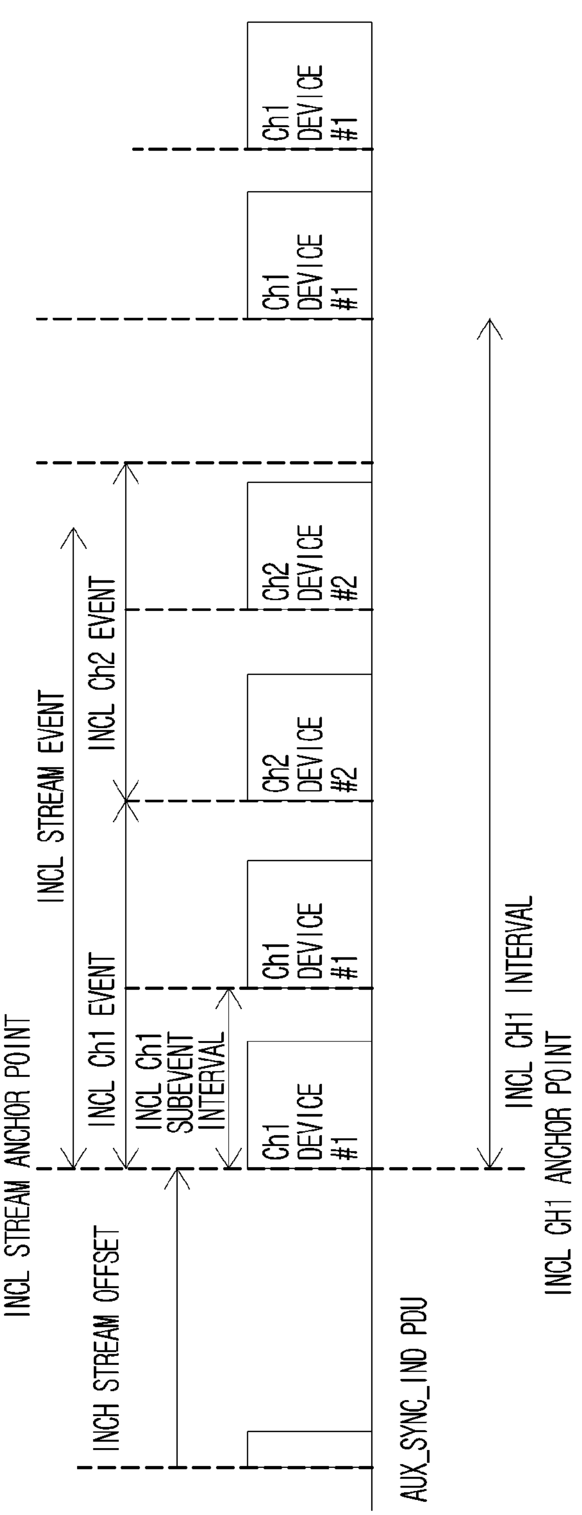
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
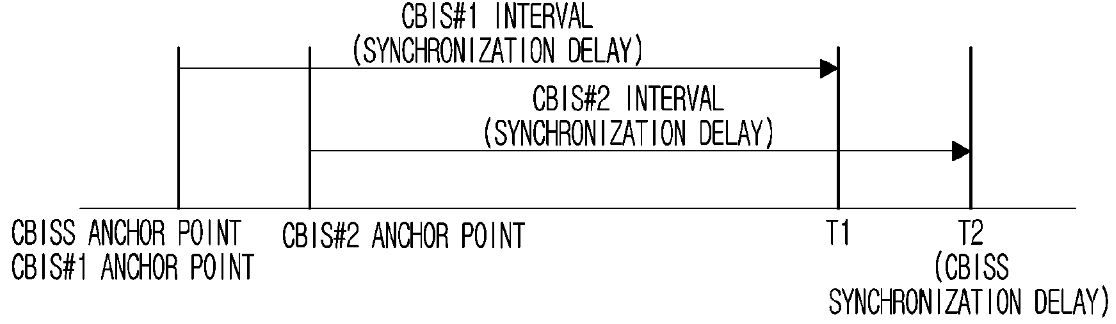
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
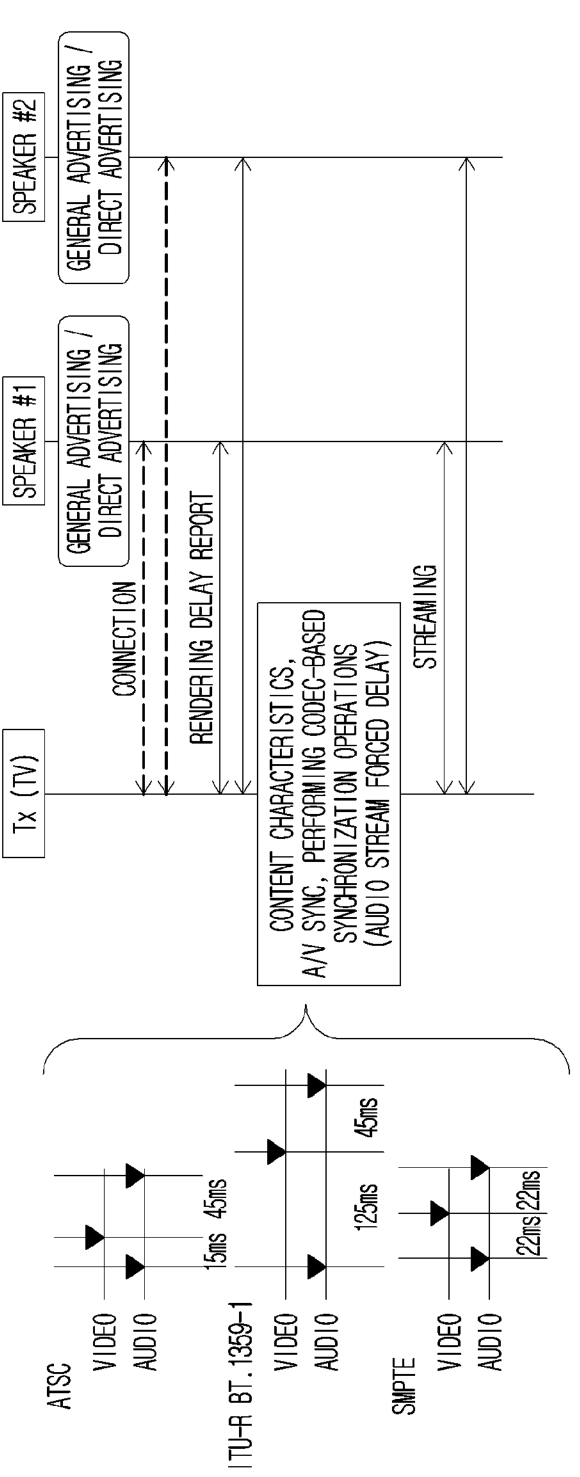
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
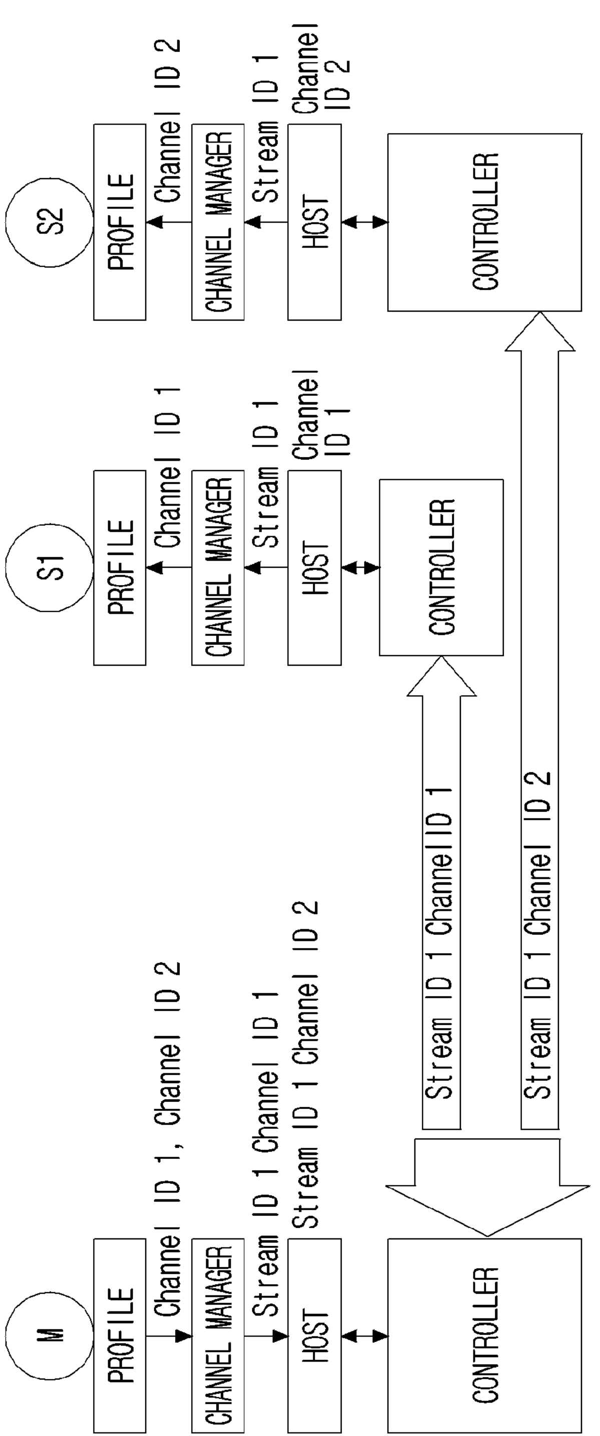

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
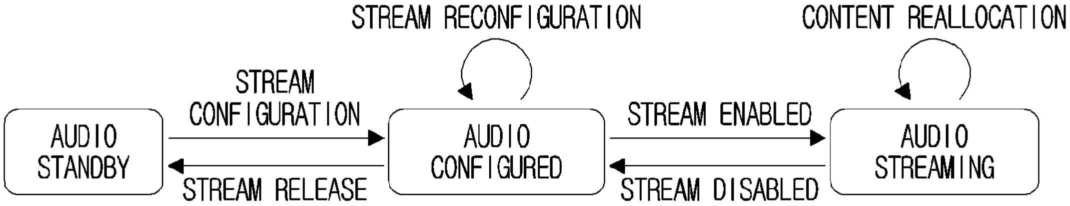
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
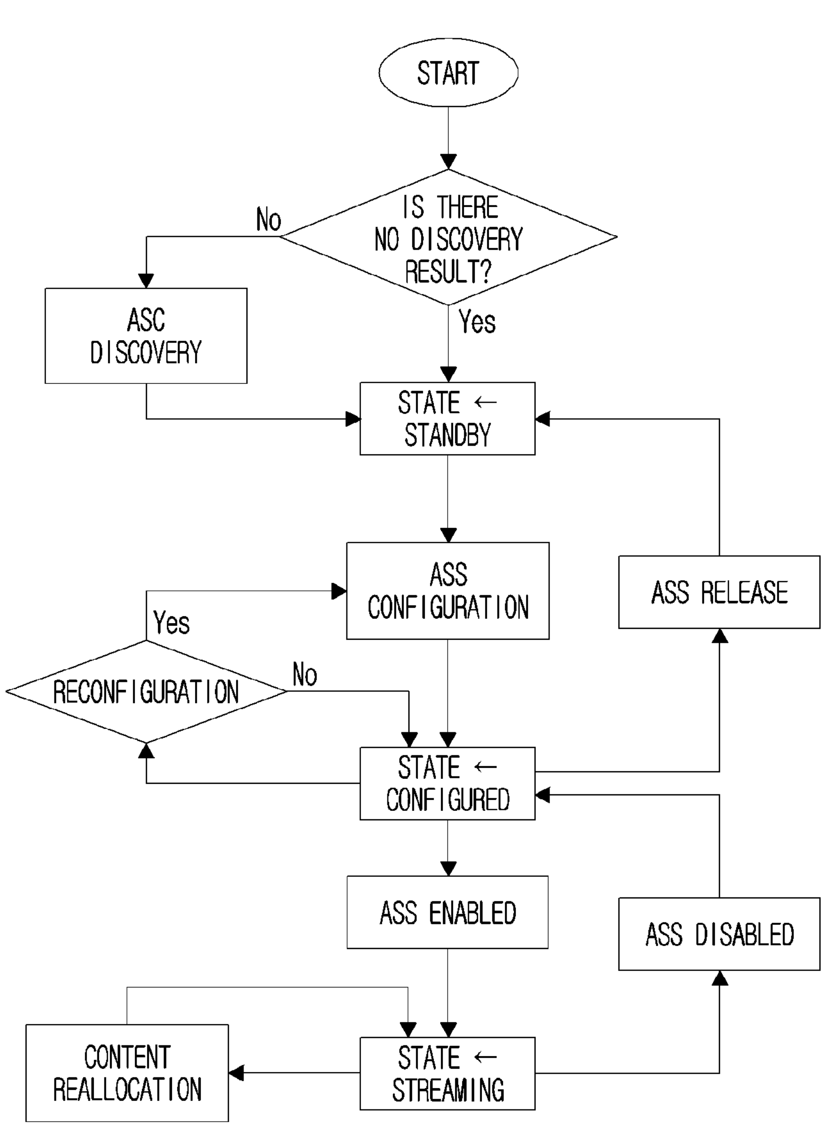
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
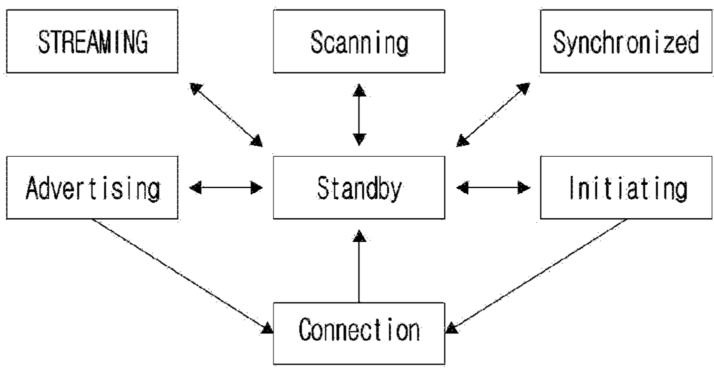
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
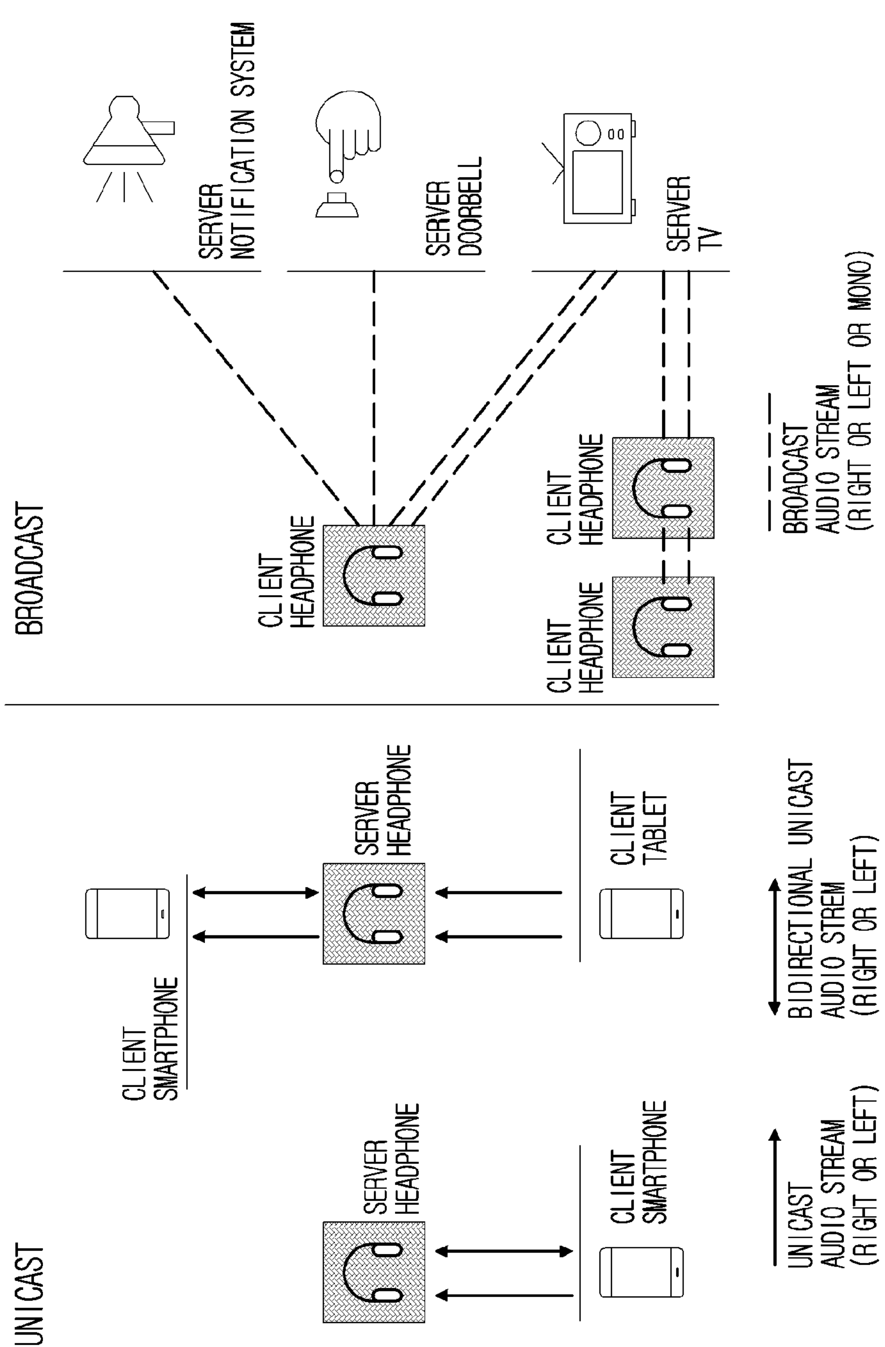
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
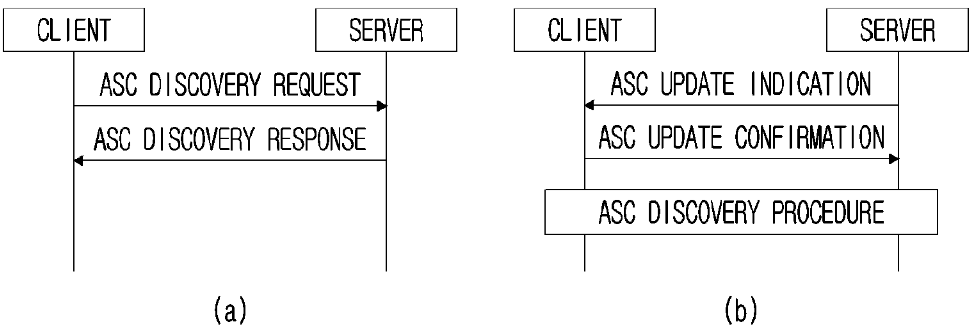

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(*a*), the client may request capability discovery by transmitting an ASC discovery request message to the server, and in response to that, the server may transmit detailed information of the capability by transmitting an ASC discovery response message to the client.

In the audio session capability update procedure of FIG. 14(*b*), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

| ASC_DISCOVERY REQUEST |
|---|
| Direction |
| **ASC_DISCOVERY RESPONSE** |
| Sink Locations: Bitmap |
| Source Locations: Bitmap |
| Number of ASC Records |
| Direction |
| Codec ID |
| Sampling Frequency |
| Codec Specific |
| Content Protection Type |
| Content Protection type Specific |

The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15(*a*), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(*b*), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

| CODEC CONFIGURATION REQUEST |
|---|
| ASS ID |
| ASA ID |
| Direction |
| Codec ID |
| Sampling Frequency |
| Codec Specific |
| **CODEC CONFIGURATION RESPONSE** |
| ASS ID |
| Server Supported QoS (Interleaved, Framed, Transport Latency) |
| Presentation delay |
| **QOS NEGOTIATION REQUEST** |
| ASS ID |
| CBISS ID |
| CBIS ID |
| Client QoS (Transport Latency) |
| Rendering Delay |
| **QOS NEGOTIATION RESPONSE.** |
| ASS ID |
| **ASS ENABLE REQUEST/ASS ENABLE RESPONSE** |
| Number of ASS ID |
| ASS ID |
| ASA ID |
| Content Type |
| **ASS RX READY COMMAND/ASS RX READY NOTIFICATION** |
| Number of ASS ID |
| ASS ID |

FIG. 16 exemplarily illustrates a procedure for disabling an audio stream by a client and a procedure for disabling an audio stream by a server.

In the procedure of the client disable audio streams in FIG. 16(*a*), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(*b*), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

| ASS DISABLE REQUEST/ASS DISABLE RESPONSE/ ASS DISABLE INDICATION |
|---|
| Number of ASS ID<br>ASS ID<br>(No Contents) |

Table 4 below exemplarily shows content reallocation request/response, ASS release request/response, general advertisement, and directed advertisement message formats.

TABLE 4

| REASSIGN CONTENT REQUEST/REASSIGN CONTENT RESPONSE |
|---|
| Number of ASS ID<br>ASS ID<br>ASA ID<br>Content Type |
| ASS RELEASE REQUEST/ASS RELEASE RESPONSE |
| ASS ID |
| GENERAL ADVERTISEMENT<br>DIRECTED ADVERTISEMENT |
| Content Type<br>Meta data |

Figure 17:
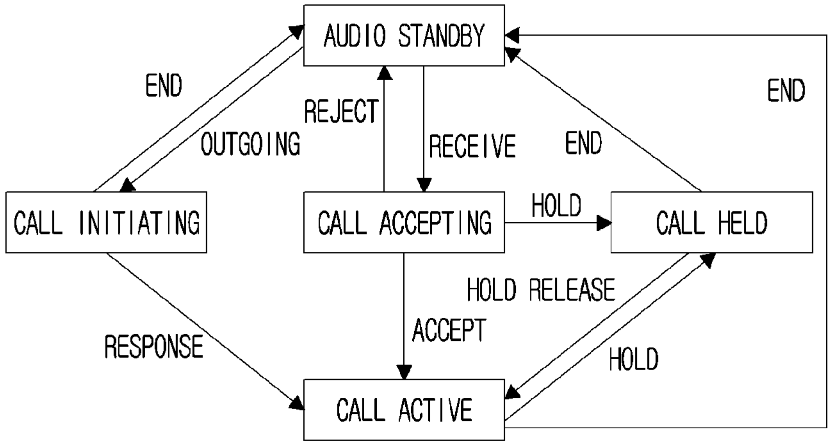
FIG. 17 is a diagram illustrating a state machine for a call service to which the present disclosure is applicable.

FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based Isochronous | Stream (framed or | LE isochronous physical link | LE | Unidirectional or bidirectional transport in a |

TABLE 5-continued

| Logical transport | Links supported | Supported by | Bearer | Overview |
|---|---|---|---|---|
| Stream | unframed) LE-S or LE-F | | | point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

Figure 18:
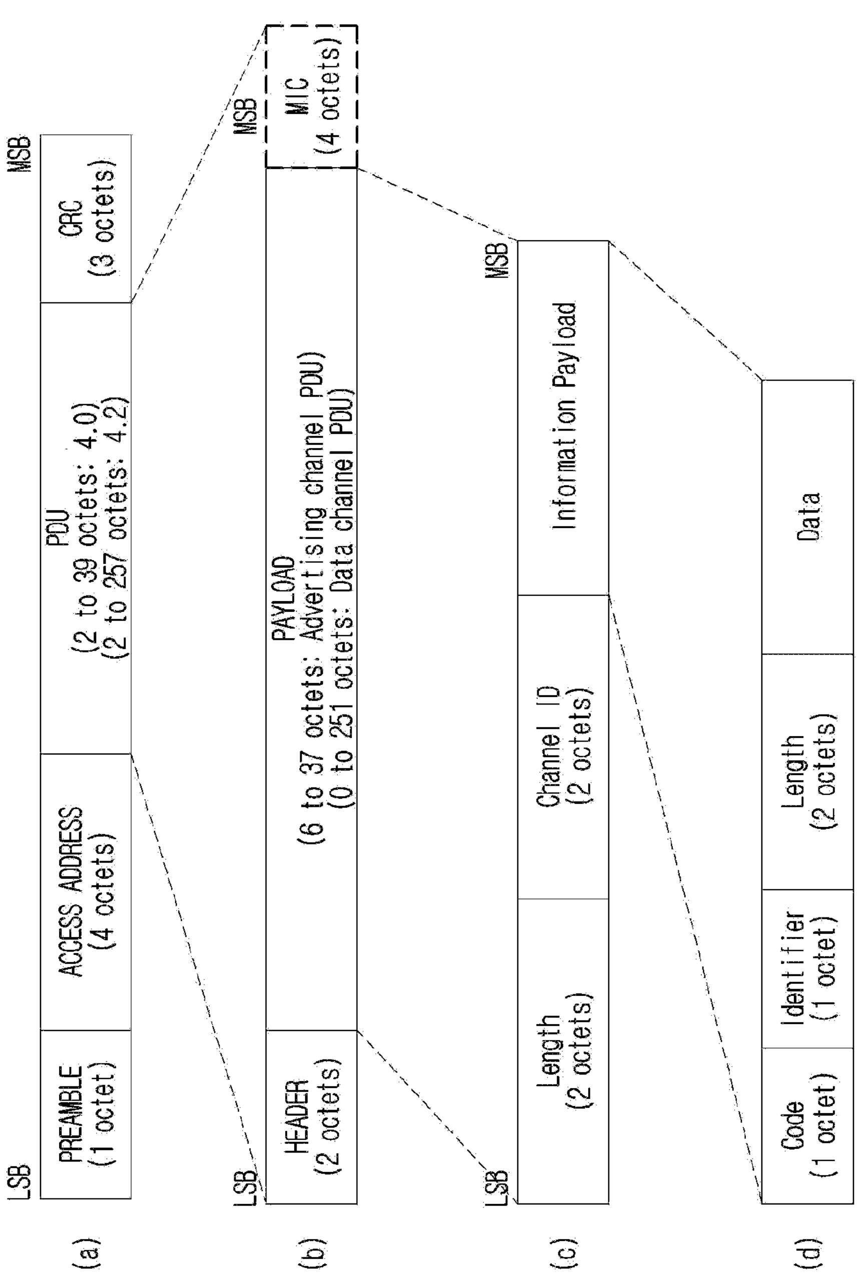
FIG. 18 is a diagram illustrating a packet format for each layer to which the present disclosure is applicable.

FIG. 18 is a diagram illustrating a packet format for each layer to which the present disclosure is applicable.

FIG. 18(*a*) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(*b*) illustrates an exemplary format of the PDU of FIG. 18(*a*). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(*c*) illustrates an example of an L2CAP PDU format, which may correspond to an exemplary format of the payload field of FIG. 18(*b*). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(*c*) is an L2CAP PDU (i.e., a control frame) transmitted on a signaling channel, the information payload field of FIG. 18(*c*) may be configured as shown in FIG. 18(*d*). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

Figure 19:
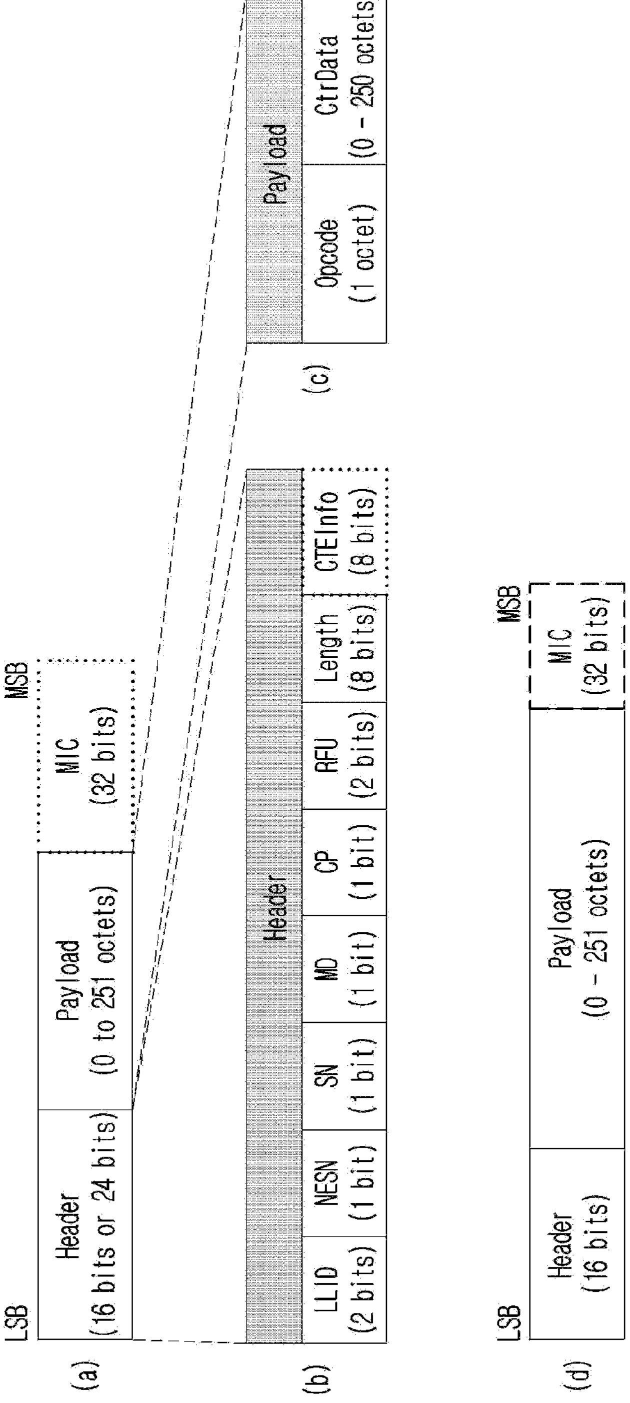
FIG. 19 is a diagram illustrating examples of a data unit format to which the present disclosure is applicable.

FIG. 19 is a diagram illustrating examples of a data unit format to which the present disclosure is applicable.

FIG. 19(*a*) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(*b*), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(*c*) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(*d*) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

Figure 20:
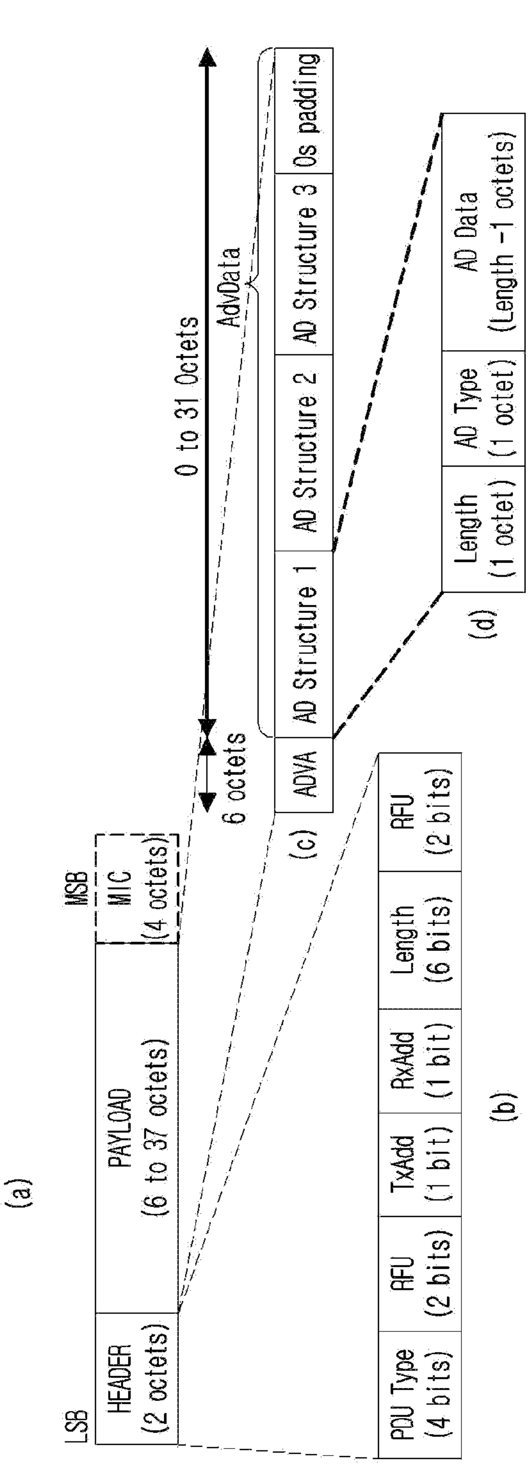
FIG. 20 is a diagram illustrating examples of an advertisement unit format to which the present disclosure is applicable.

FIG. 20 is a diagram illustrating examples of an advertisement unit format to which the present disclosure is applicable.

FIG. 20(*a*) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(*b*) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(*c*) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(*d*) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, examples of channel selection according to the present disclosure will be described.

Figure 21:
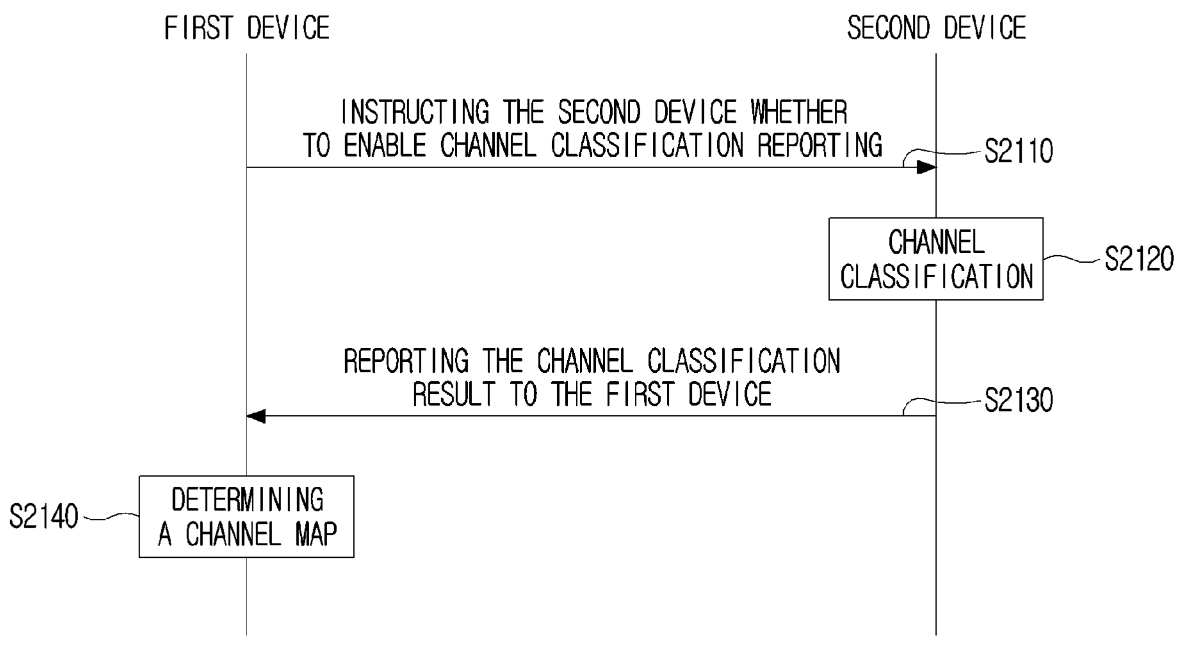
FIG. 21 is a flowchart for describing an embodiment of a channel selection operation according to the present disclosure.

FIG. 21 is a flowchart for describing an embodiment of a channel selection operation according to the present disclosure.

FIG. 21 is a flowchart for explaining an embodiment of a channel selection operation according to the present disclosure.

In step S2110, the first device may the second device whether to enable channel classification reporting. For example, the first device may be a master device and the second device may be a slave device.

For example, information on whether channel classification report is enabled may be included in a link layer (LL) PDU related to an indication for channel report. For example, the LL of the first device may transmit a channel report indication PDU to the LL of the second device, and the LL of the second device may receive it.

The indication for the channel report may indicate whether to enable or disable the channel classification report.

In step S2120, the second device may perform channel classification. For example, when the channel classification report of the second device is enabled in step S2110, the second device may perform the channel classification.

Channel classification may be performed in the LL of the second device. For example, the LL of the second device may perform channel classification based on one or more of information provided from the host or channel sensing (or channel assessment).

Channel classification may be performed on one or more channels. A result of the channel classification may include a status of good, bad, etc, for each of one or more channels. Also, when the state cannot be known because channel sensing is impossible, the state (e.g., unknown) may also be included in the channel classification result.

In addition, information provided from the host of the second device to the LL of the second device in relation to the channel classification in the LL of the second device may include channel map information. A specific example of the channel map information will be described later.

In step S2130, the second device may report the channel classification result to the first device.

For example, information on a channel classification result may be included in an LL PDU related to an indication of a channel state. For example, the LL of the second device may transmit the channel state indication PDU to the LL of the first device, and the LL of the first device may receive it.

When the channel classification report is enabled and the channel classification result is changed, the second device may report an additional (or updated) channel classification result to the first device.

In operation S2140, the first device may determine a channel map.

For example, the LL of the first device may determine the channel map based on at least one of a channel sensing (or channel evaluation) result in the first device, information provided from the host of the first device, or a channel classification result report received from the second device.

Based on the channel map determined by the first device, a channel hopping pattern may be applied. For example, the channel map may indicate a used or unused channel, and channel hopping may be applied on the used channel(s).

Although not shown in FIG. 21, the channel map determined by the first device may be provided to the second device. Accordingly, the second device may also perform hopping based on the channel map determined by the first device.

In addition, although not shown in FIG. 11, the LL that has received the message/PDU exchanged between the LL of the first device and the LL of the second device may feed back an ACK message to the LL that transmitted it.

Hereinafter, various examples of the present disclosure related to the channel selection operation of FIG. 21 will be described.

Interference may occur when a BLE channel partially or completely overlaps a channel used by another device or a device of another network system (e.g., BR/EDR, Zigbee, WLAN (or Wi-Fi), etc.). Since such interference affects BLE audio transmission performance, a method for avoiding interference is required. However, in the conventional BLE system, a channel selection method in consideration of a channel state is not supported.

According to the present disclosure, in a BLE system, a slave device reports channel state information or a channel map to a master device, and the master device applies a channel selection or channel mapping algorithm based on the reported information to avoid an interference channel.

Figure 22:
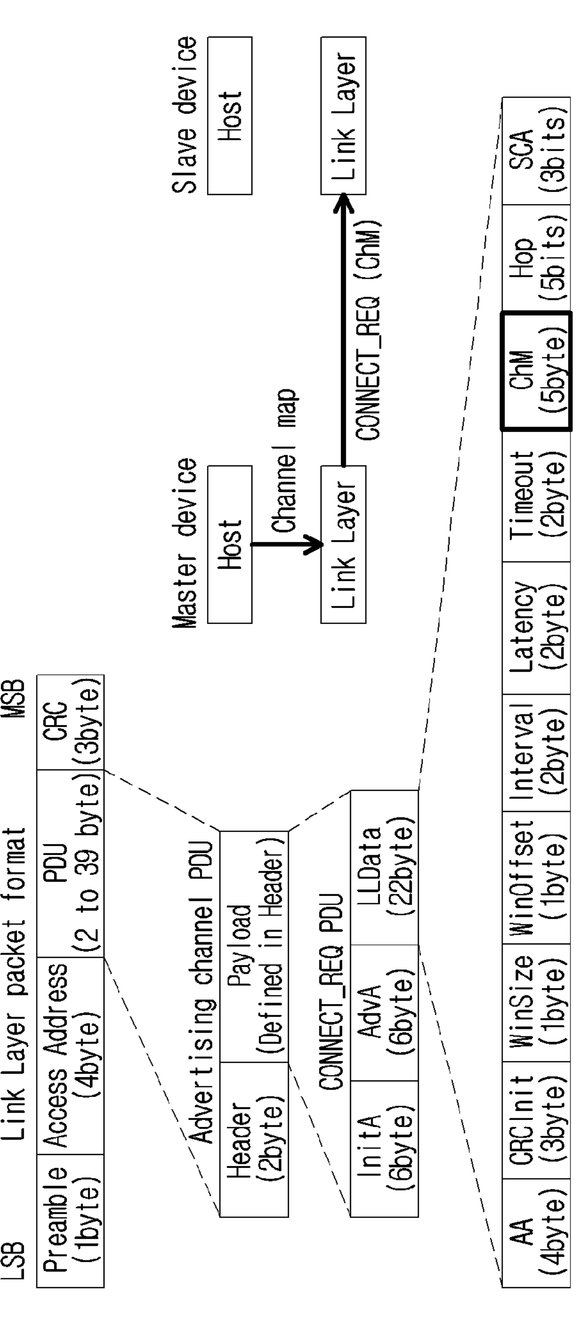
FIG. 22 is a diagram for describing channel map information to which the present disclosure may be applied.

FIG. 22 is a diagram for describing channel map information to which the present disclosure may be applied.

In the example of FIG. 22, an advertising channel PDU is included in the PDU field of the LL packet format, and a connection request (CONNECT_REQ) PDU is included in the payload field of the advertising channel PDU. The LL Data field of the connection request PDU may include a channel map (ChM) field.

The channel map field may include channel map information indicating a used or unused data channel. Each channel may be indicated by a bit positioned according to a data channel index. For example, the LSB may correspond to data channel index 0, and the 36th bit may correspond to data channel index 36. In addition, when the bit value is 0, it may indicate unused, and when the bit value is 1, it may indicate used. For example, when a certain channel is marked as unused, it may mean that interference exists in the corresponding channel or that it is greater than a predetermined criterion. In addition, when a certain channel is marked as being used, it may mean that the corresponding channel does not have interference or that it is smaller than a predetermined criterion.

Such channel map information may be transmitted from the host of the master device to the LL, and a connection request message including the channel map field may be transmitted to the LL of the slave device.

Figure 23:
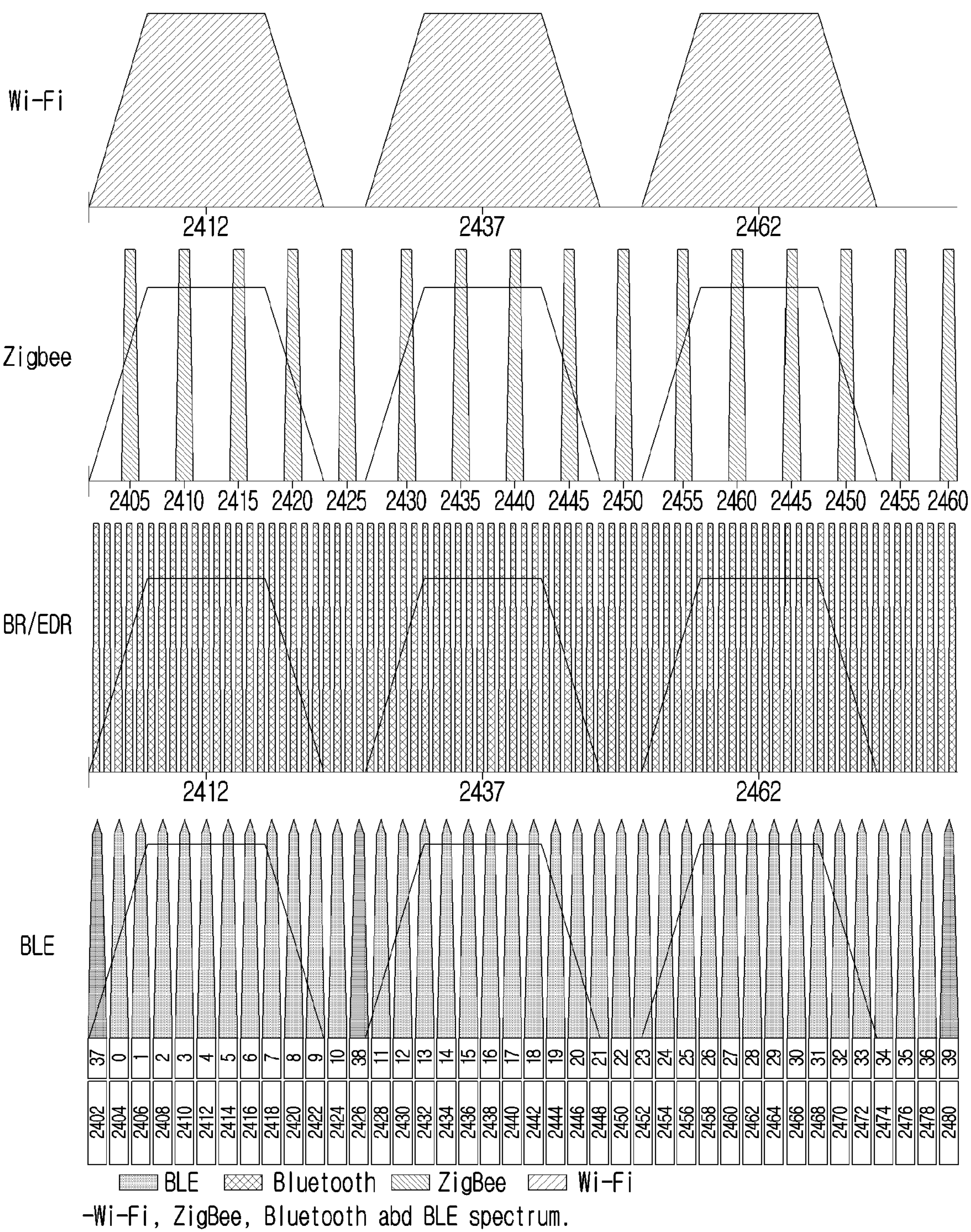
FIG. 23 is a diagram for describing a channel structure of different network systems to which the present disclosure may be applied.

FIG. 23 is a diagram for describing a channel structure of different network systems to which the present disclosure may be applied.

Table 6 below shows the BLE RF channel. A total of 40 channels of RF channels 0 to 39 are defined, and the interval between the center frequencies of each channel is 2 MHz. Among them, three channels are defined as advertising channels, and their channel indexes are 37, 38 and 39. The remaining 37 channels are defined as data channels, and their channel indexes are 0 to 37.

TABLE 6

| RF Channel | RF Center Frequency | Channel Type | Data Channel | Advertising Channel Index |
|---|---|---|---|---|
| 0 | 2402 MHZ | Advertising channel | | 37 |
| 1 | 2404 MHZ | Data channel | 0 | |
| 2 | 2406 MHZ | Data channel | 1 | |
| ... | ... | Data channel | ... | |
| 11 | 2424 MHZ | Data channel | 10 | |
| 12 | 2426 MHz | Advertising channel | | 38 |
| 13 | 2428 MHz | Data channel | 11 | |
| 14 | 2430 MHz | Data channel | 12 | |
| ... | ... | Data channel | ... | |
| 38 | 2478 MHZ | Data channel | 36 | |
| 39 | 2480 MHz | Advertising channel | 39 | |

A channel defined by another network system such as Wi-Fi (or WLAN), Zigbee, or BR/EDR may exist in an Industrial Scientific and Medical (ISM) band of 2.4 GHz in which the BLE channel is defined.

In the 2.4 GHz band, in Wi-Fi, 13 channels having a center frequency interval of 5 MHz are generally defined, and in the example of FIG. 21, channel numbers 1, 6, and 11 are exemplarily shown as non-overlapping channels. In Zigbee, 16 channels with an interval between center frequencies of 5 MHz are defined. In BR/EDR, 79 channels with an interval between center frequencies of 1 MHz are defined. As such, since channels of other network systems are defined in the frequency band where the BLE channel is defined, interference due to the operation of devices of other network systems may affect the BLE device.

Figure 24:
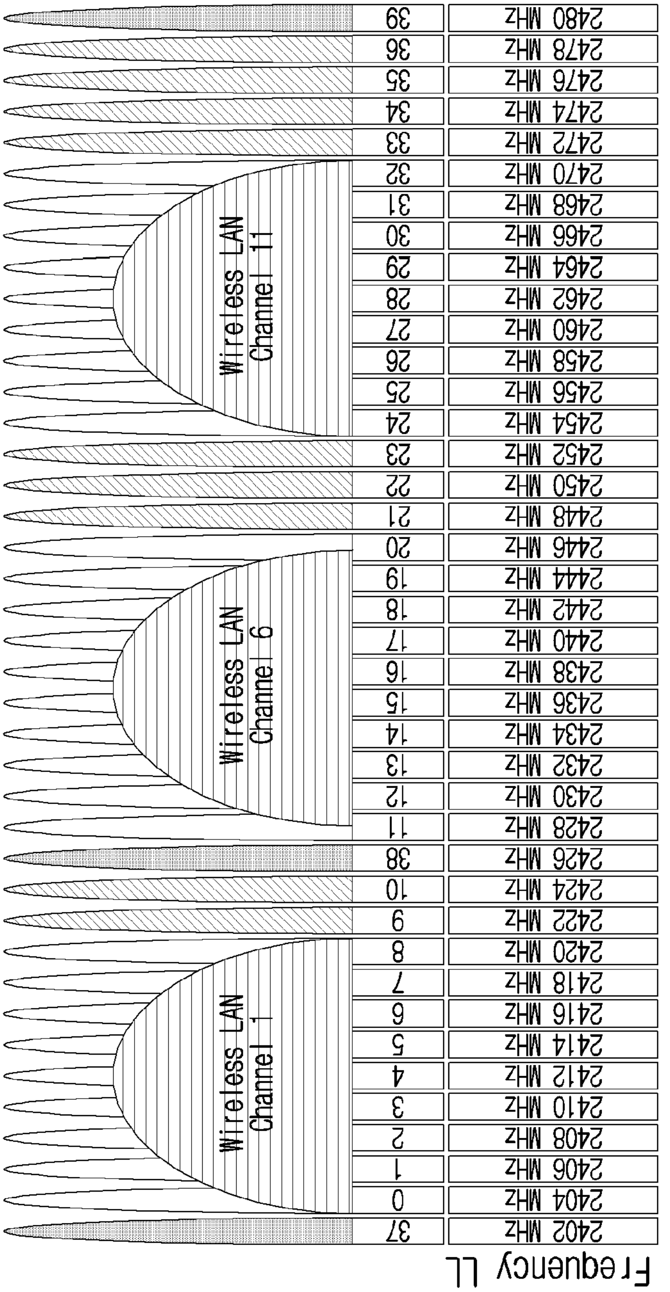
FIG. 24 is a diagram for describing a relationship between a BLE channel and a WLAN channel to which the present disclosure may be applied.

FIG. 24 is a diagram for describing a relationship between a BLE channel and a WLAN channel to which the present disclosure may be applied.

Figure 25:
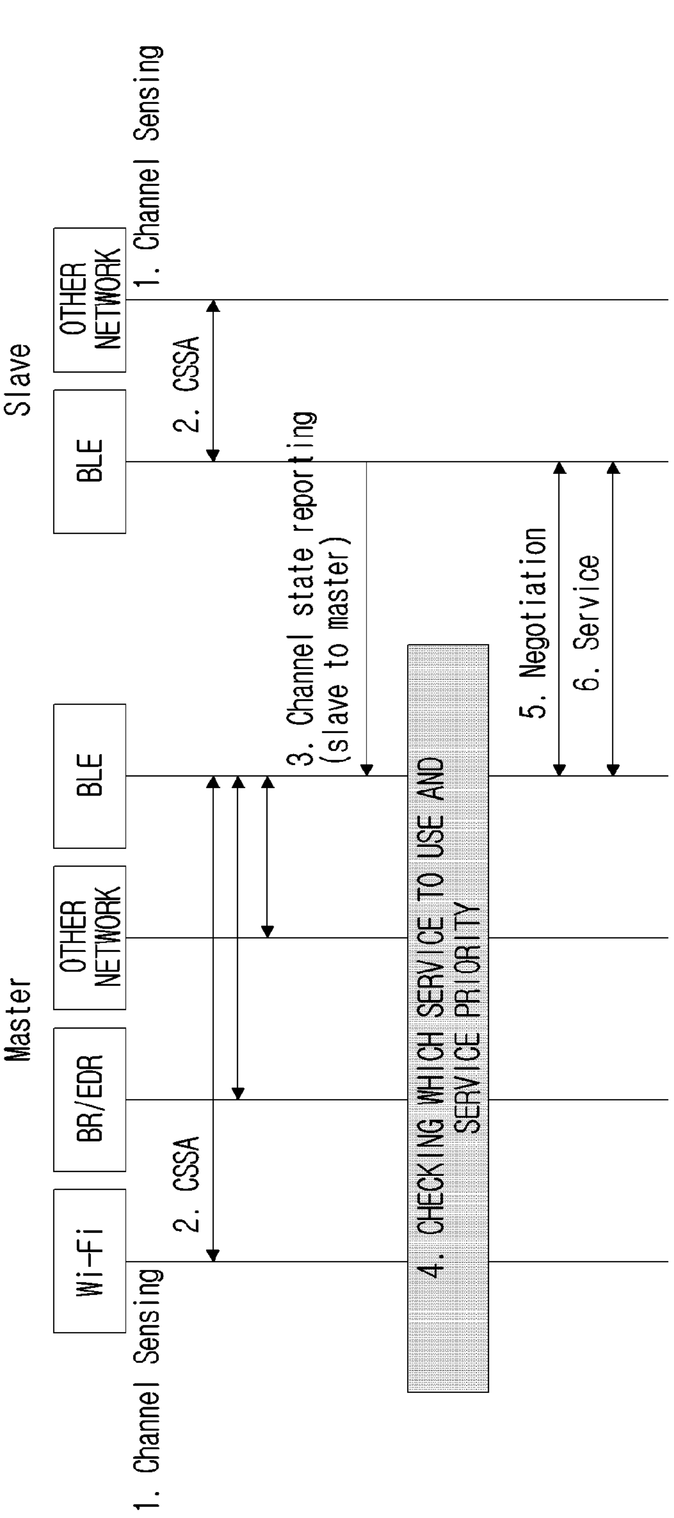
FIG. 25 is a flowchart of an exemplary method for channel map reporting to which this disclosure may be applied.

In FIG. 25, frequency positions of channel indexes 37, 38, and 39 corresponding to advertising channels among BLE channels are shown in comparison with WLAN channels 1, 6, and 11.

As described above, BLE and BR/EDR use the 2.400 MHz to 2483.5 MHz spectrum, which is the ISM band. In the case of BR/EDR, communication is performed using 79 channels of 1 MHz each, and in the case of BLE, communication is performed using 20 channels of 2 MHz each.

In addition, in the Bluetooth system, communication is performed while changing channels 1600 times per second to prevent interference. This is called frequency hopping.

While performing communication using frequency hopping, a channel with severe interference may be checked and frequency hopping may be performed on channels other than the checked channel. This is called adaptive frequency hopping (AFH).

In the case of BR/EDR, AFH may be performed using whether unused or used, which is indicated by the channel map for 79 channels. For example, in the case of BR/EDR, a hopping pattern may be configured using channels without interference (e.g., channels indicated as "used" in the channel map) based on a channel map and frequency hopping may be performed.

In BLE, information on whether a channel indicated by a channel map for 37 data channels is unused or used may be used for a channel selection algorithm. For example, in the case of BLE, if interference due to wireless communication of other network systems enters data channels 0, 1, and 2, the master device may configure the channel map by checking channels 0, 1, and 2 as “unused” and the remaining channels as “used”.

If switching to BR/EDR while performing BLE communication, since the channel map information for 37 data channels configured in BLE cannot be directly applied to BR/EDR operation, in order to perform AFH in BR/EDR, a channel map for 79 channels may be configured and frequency hopping may be performed.

In order to perform a channel selection operation based on the channel map in the BLE system, the following requirements may be applied.

The BLE slave device may report channel classification information to the master device.

The BLE channel classification information may include a BR/EDR channel classification information comparison. For example, the BLE channel classification information may classify a channel according to the same criterion as the BR/EDR channel classification information, or a new criterion may be applied. In addition, the BLE channel classification information may be defined by applying a predetermined weight or a scaling factor based on the BR/EDR channel classification information. In addition, the BLE channel classification information may be defined as differential information including information on a different part compared to the BR/EDR channel classification information.

The BLE channel classification information may include information on a channel state. The channel condition may indicate whether the channel is good or bad. For example, the channel state for a specific channel may indicate whether the state of the corresponding channel is greater than or less than a predetermined threshold (i.e., two-level classification). In addition, the channel state may be classified into two or more levels. For example, a channel condition may be classified as one of unknown if a particular channel is good, bad, or if channel sensing (or channel evaluation) is not sufficient for channel classification.

Also, the channel state may be determined according to whether a packet error occurs in the corresponding channel. In addition, the channel state may be determined based on the magnitude of interference in the corresponding channel, received signal strength, SINR, error rate, energy detection, and the like.

In addition, a protocol for a channel selection operation based on a channel map between the BLE master device and the slave device may be defined.

For example, the slave device may classify the channel and report classification information to the master device.

In addition, it may be configured to apply or not to apply (on/off) a feature for channel map exchange or a feature for channel selection based on the channel map. A kind/type for these features may be defined. In addition, by subdividing these features, it may be configured to apply some or all of the features or not to apply them.

As described above, according to the exemplary embodiments of the present disclosure for channel selection in consideration of the channel map, robustness may be greatly improved and effective throughput may be improved.

FIG. 25 is a flowchart of an exemplary method for channel map reporting to which the present disclosure may be applied.

In FIG. 25, the master device may perform channel sensing in step 1. Channel sensing may include determining a channel condition. In addition, channel sensing may include sensing for a BLE channel. In addition, the channel sensing may further include sensing for a channel of another network system (e.g., Wi-Fi, BR/EDR, other networks (e.g., Zigbee), etc.).

The master device may perform a Channel State Share Algorithm (CSSA) in step 2. CSSA may include determining a channel state in the second network system by using a channel sensing result in the first network system. Furthermore, CSSA may include determining a channel state in the first network system by using a channel sensing result in the second network system. A detailed operation of CSSA will be described later.

Meanwhile, the slave device may perform sensing for a channel of BLE and/or another network system (e.g., Wi-Fi, BR/EDR, other networks (e.g., Zigbee), etc.) in step 1, and may perform a CSSA operation in step 2.

In step 3, the slave device may transmit a channel status report to the master device. For example, the slave device may transmit the channel status report to the master device in a connectionless method (or broadcast method) or a connection-based method.

In step 4, the master device may check the service type to be used and the priority of the corresponding service. For example, priority may be given according to the time sensitivity of the service type. Examples of service types may include audio, medical, location, and the like. For example, Wi-Fi may be in an idle state and a BLE audio service may be performed. Alternatively, the BLE heart rate measurement service may be performed while the Wi-Fi video streaming service is being performed. Alternatively, the BLE audio service may be performed while the Wi-Fi Internet browsing service is being performed.

In step 5, in consideration of various service types and priorities between services, the BLE module (or controller) of the master device may negotiate with the BLE module (or controller) of the slave device to minimize interference with the BLE channel. Such negotiation may include selecting a channel based on one or more of channel status report information, service type, or service priority.

In step 6, a service may be performed on a channel selected through negotiation.

Figure 26:
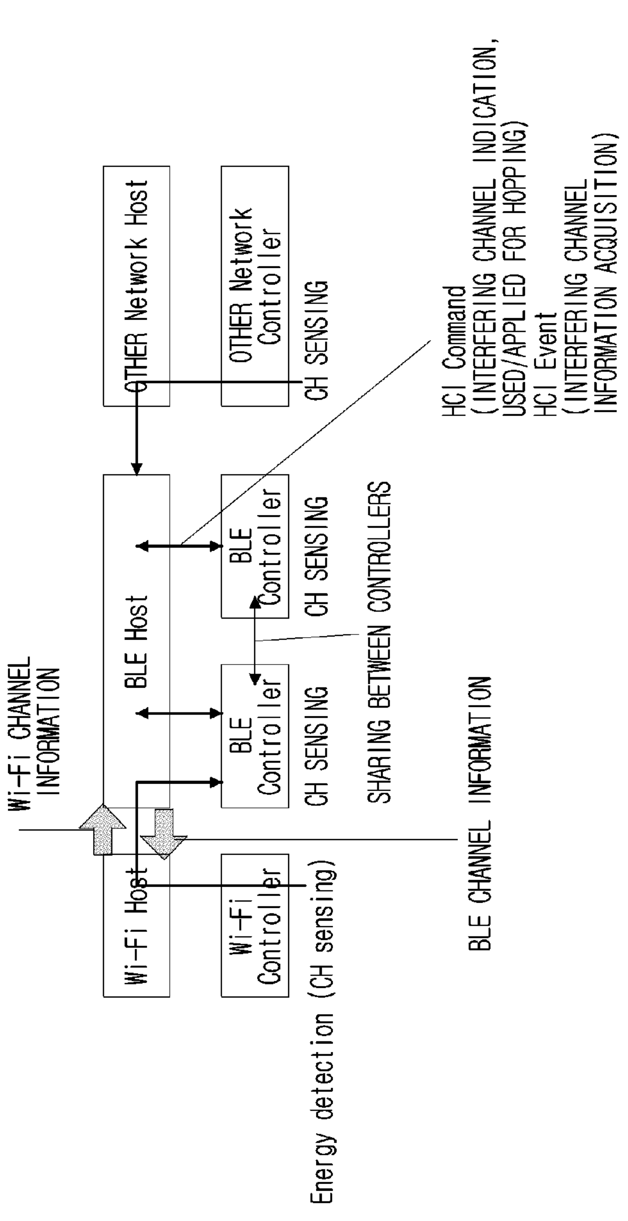
FIG. 26 is a diagram for describing an example of an operation of channel state sharing to which the present disclosure may be applied.

FIG. 26 is a diagram for describing an example of an operation of channel state sharing to which the present disclosure may be applied.

It is assumed that the device performing the CSSA operation according to the present disclosure includes a plurality of types of network modules. For example, the device may include a first network module and a second network module. The first network module may determine a channel state for the first network channel and transmit the first network channel state information to the second network module. The second network module may determine a channel state for the second network channel and transmit the second network channel state information to the first network module. The channel state information of each network module may be exchanged or transmitted in one direction.

For example, the device may include a protocol stack including a BLE host and a BLE controller, and a protocol stack including a Wi-Fi host (or higher layer above MAC) and a Wi-Fi controller (or PHY layer). Additionally, the device may further include a protocol stack comprising one or more other (or third, fourth, . . . ) network hosts and controllers.

The BLE controller may perform channel sensing for the BLE channel. Channel sensing may include determining a state (e.g., packet error rate, etc.) of a BLE channel. The BLE host may generate channel map information indicating used/unused for each channel based on the channel state information transmitted from the BLE controller(s). Information exchange between the BLE host and the controller may be performed through an HCl command from the host to the controller and an HCl event from the controller to the host. For example, the HCl command may include information on an interference channel indication, which channel is used/applied for frequency hopping, and the like. The HCl event may include interference channel information. Also, channel state information may be exchanged between BLE controllers.

Such BLE channel state information may be transmitted from the BLE host to the Wi-Fi host. Accordingly, the Wi-Fi host may use the channel selection or interference avoidance in Wi-Fi operation in consideration of the BLE channel state.

Meanwhile, the Wi-Fi controller may perform channel sensing for a Wi-Fi channel. For example, channel sensing may include determining the degree of interference using an energy detection method or a clear channel assessment (CCA) method for a Wi-Fi channel. The channel state information for the Wi-Fi channel may be delivered to the BLE host through the Wi-Fi host.

Like this, the first network (e.g., BLE) channel state information and the second network (e.g., Wi-Fi) channel state information may be exchanged with each other, and the first network module may be applied to the first network channel selection or interference avoidance, etc. based on the second network channel state information, and the second network module may be applied to a second network channel selection or interference avoidance based on the first network channel state information.

Meanwhile, the BLE host may receive channel state information by channel sensing of other network (e.g., BR/EDR, Zigbee, etc.) controllers through other network hosts, and may determine BLE channel selection or interference avoidance by additionally considering this.

Figure 27:
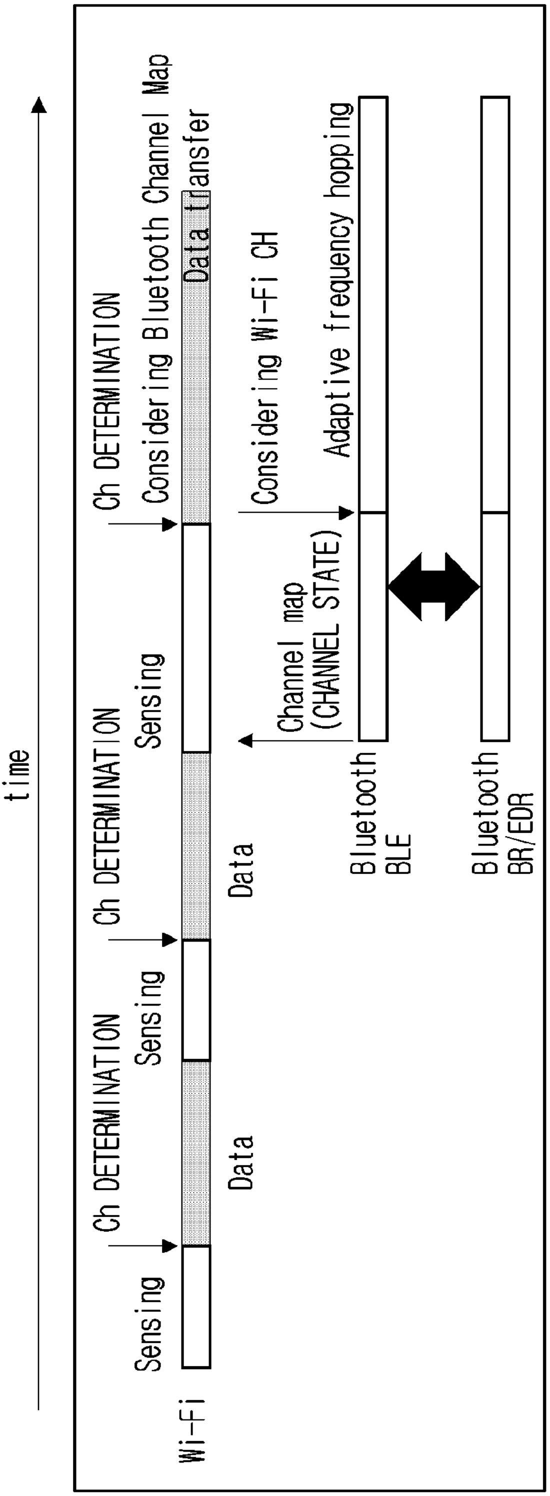
FIG. 27 is a diagram for describing a channel map sharing timing to which the present disclosure may be applied.

FIG. 27 is a diagram for describing a channel map sharing timing to which the present disclosure may be applied.

The Wi-Fi module may perform channel sensing for a Wi-Fi channel before data transmission, and may perform data transmission on a Wi-Fi channel determined through channel sensing. When the Wi-Fi module receives the channel map (or channel state) information for the BLE channel from the BLE module, the Wi-Fi module receives the channel state information for the BLE channel in performing channel sensing for the Wi-Fi channel. A channel may be determined by additional consideration.

When the BLE module receives channel state information for the Wi-Fi channel from the Wi-Fi module, the BLE channel may be selected or AFH may be performed in consideration of this.

In addition, the BLE module may share channel state information with the BR/EDR module and perform BLE channel selection or AFH by additionally considering channel state information for the BR/EDR channel.

Figure 28:
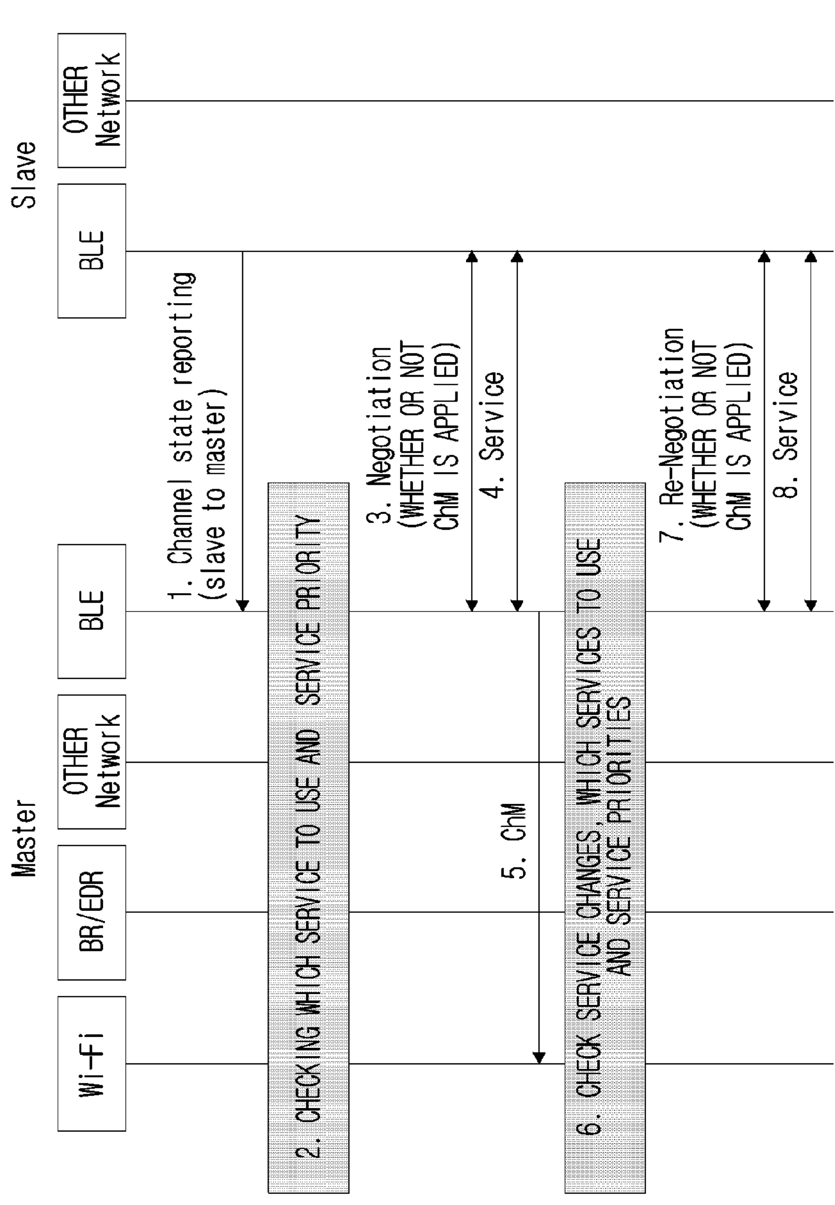
FIG. 28 is a diagram for describing activation or deactivation of a channel map application function in a service change to which the present disclosure may be applied.

FIG. 28 is a diagram for describing activation or deactivation of a channel map application function in a service change to which the present disclosure may be applied.

Steps 1 to 4 of FIG. 28 may correspond to steps 3 to 6 of FIG. 25. That is, channel sensing and CSSA operations may be performed before step 1 of FIG. 28, and based on this, a channel state report may be performed, and negotiation and service including channel selection may be performed in consideration of channel state information, service type, service priority, and the like.

Here, in the negotiation operation of step 2, it may be determined to activate or deactivate the channel map (ChM) application function. When the channel map application function is activated, channel selection or AFH may be performed in consideration of channel state information. When the channel map application function is deactivated, the service may be performed without considering the channel state information.

When the channel map information for the BLE channel is provided to the Wi-Fi module in step 5, the Wi-Fi module may select a channel in consideration of a sensing result (e.g., CCA result) for a Wi-Fi channel and channel map information for a BLE channel in a channel sensing period.

In step 6, the service type and service priority of the service to be changed may be checked.

In step 7, re-negotiation including selecting a BLE channel based on one or more of channel map (or channel state) information, service type, or service priority may be performed. The re-negotiation process may include activation or deactivation of the channel map application function.

In step 8, the service may be performed on the selected channel through re-negotiation.

Figure 29:
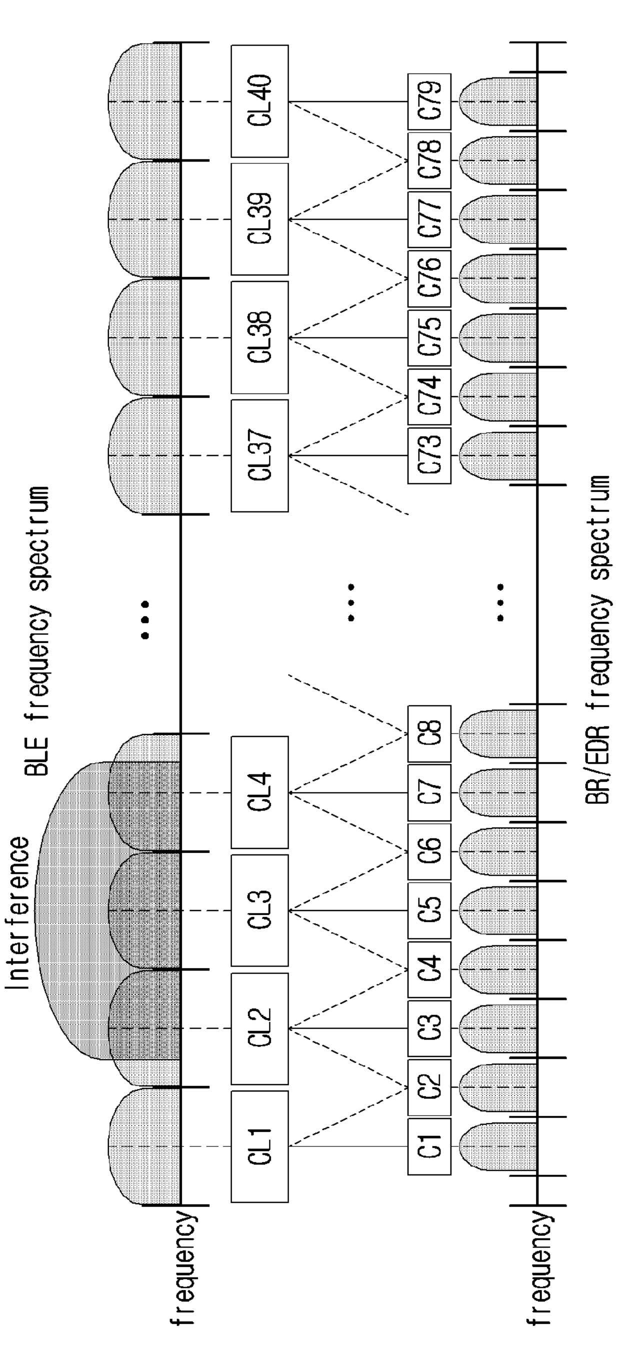
FIG. 29 to 31 are diagrams for describing an operation of a channel state sharing algorithm (CSSA) to which the present disclosure may be applied.
Figure 30:
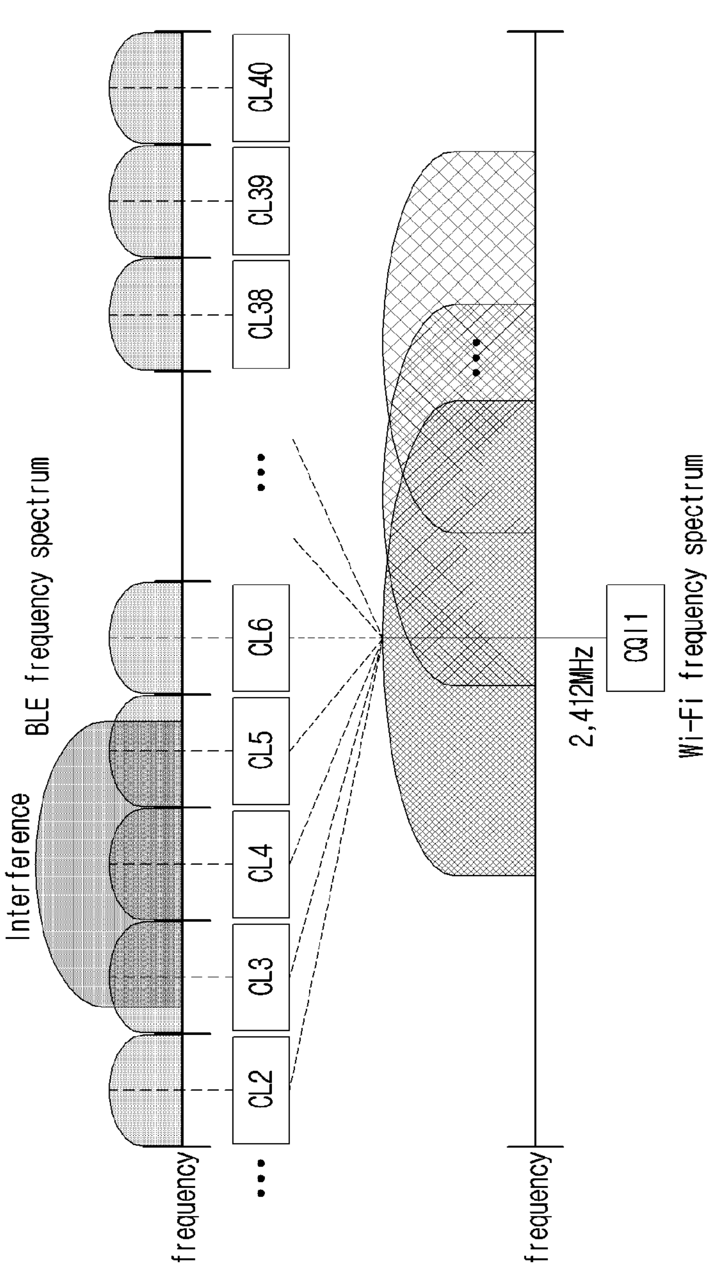
Figure 31:
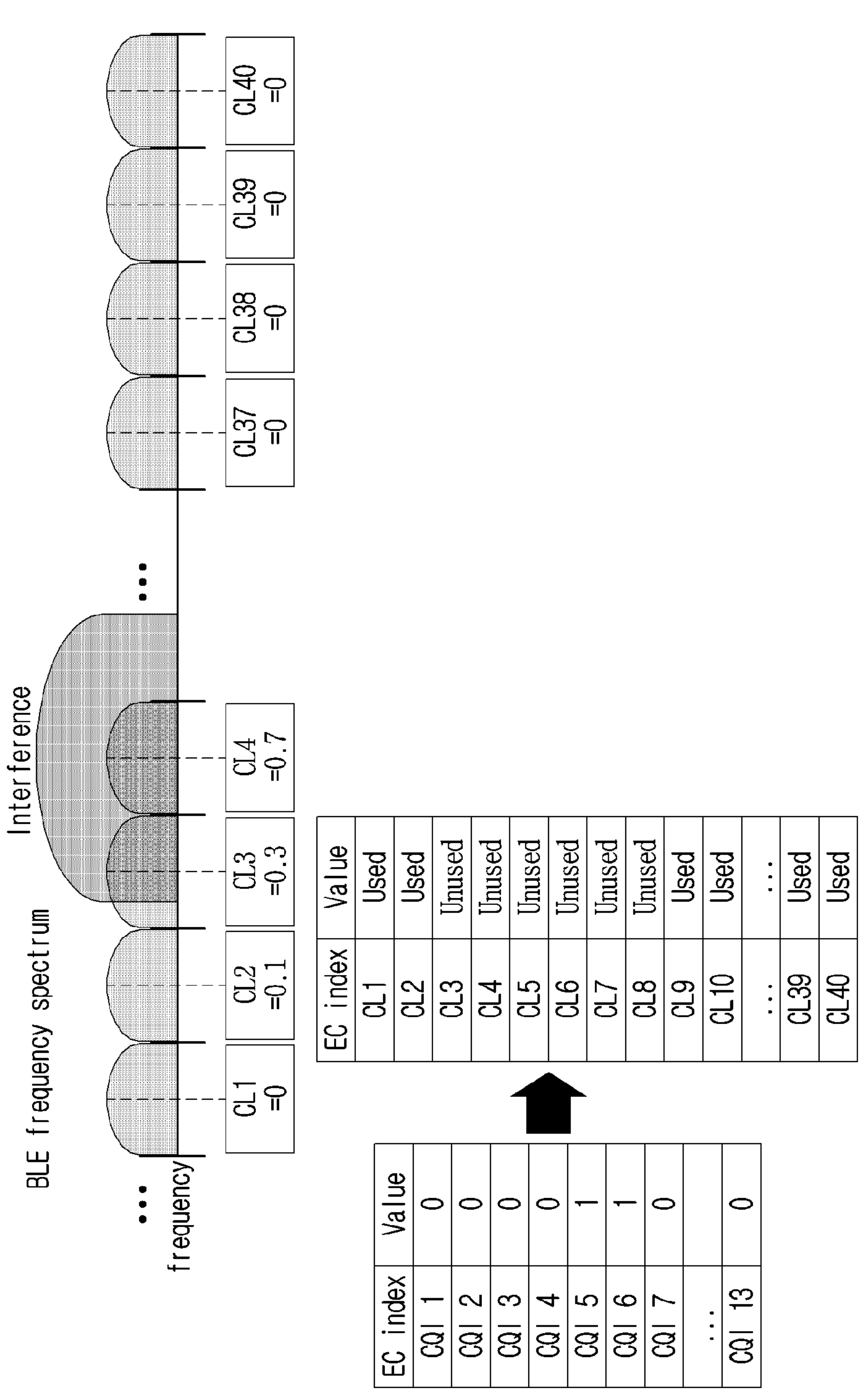

FIGS. 29 to 31 are diagrams for describing an operation of a channel state sharing algorithm (CSSA) to which the present disclosure may be applied.

CSSA may include estimating a channel state in the second network based on the channel state information of the first network, and estimating the channel state in the first network based on the channel state information of the second network.

For example, estimating a BR/EDR channel state using channel information obtained from BLE may be referred to as a BR/EDR channel estimation algorithm. In addition, estimating the BLE channel state using channel information acquired from BR/EDR, Wi-Fi, and other networks may be referred to as a BLE channel estimation algorithm. In addition, estimating a Wi-Fi channel state using channel information obtained from BLE may be referred to as a Wi-Fi channel estimation algorithm.

In the example of FIG. 29, it is assumed that the first network is BLE and the second network is BR/EDR. $CL_n$ represents a value (or variable) representing a channel state for the BLE channel index n, and Cn represents a value (or variable) representing a channel state for the BR/EDR channel index n.

C or CL is a 1-bit value and may have a value of 0 or 1. In this case, 0 may represent used, 1 may represent unused. That is, when the channel state is poor or the interference is large, the channel state value may be 1. If the channel state is classified into two or more levels, C or CL may be defined as a value having a size of two or more bits.

In the case of BLE, a channel state value of a channel having a center frequency of 2042 MHz may be defined as $CL_1$, 2404 MHz is $CL_2$, . . . , 2480 MHz is $CL_{40}$.

In the case of BR/EDR, a channel state value of a channel having a center frequency of 2401 MHz may be defined as $C_1$, 2402 MHz as $C_2$, . . . , 2479 MHz as $C_{79}$.

The BR/EDR channel map estimation algorithm may be expressed as in Equation 1 below.

$$EC_n = \begin{cases} S_1 \times CL_{n/2} + S_2 \times CL_{n/2+1} & \text{if } n \bmod 2 \equiv 0 \\ CL_{(n+1)/2} & \text{if } n \bmod 2 \equiv 1 \end{cases} \quad \text{[Equation 1]}$$

In Equation 1, when n is an even number (i.e., n mod 2=0), the channel state estimation value for BR/EDR channel n (i.e., estimated Channel, $EC_n$) may be determined based on channel state information for the BLE channels n/2 and n/2+1. For example, the channel state estimation value for BR/EDR channel 4 ($EC_4$) may be determined as the sum of a value obtained by applying a first scaling factor ($S_1$) to channel state information of BLE channel 2 ($CL_2$) and a value obtained by applying a second scaling factor ($S_2$) to channel state information of BLE channel 3 ($CL_3$). This is because the BR/EDR channel of even index in the frequency domain corresponds to the frequency position of each part of two consecutive BLE channels, it may mean that the channel state estimation value for BR/EDR channel is determined based on the channel state values of these BLE channels.

Here, each of the scaling factors $S_1$ or $S_2$ may be defined as a value between 0 and 1. $S_1$ and $S_2$ may be defined as the same value or may be defined independently.

In Equation 1, when n is an odd number (that is, n mod 2=1), the channel state estimation value (i.e., $EC_n$) of the BR/EDR channel n may be determined to be the same as the channel state information of the BLE channel n/2. For example, the channel state estimation value $EC_3$ for the BR/EDR channel 3 may be determined to be the same as the channel state information $CL_2$ for the BLE channel 2. This may mean that since the BR/EDR channel of the odd index corresponds to the BLE channel of the same position in the frequency domain, the channel state value of the corresponding BLE channel is applied to the BR/EDR channel as it is.

The BLE channel map estimation algorithm may be expressed as in Equation 2 below.

$$ECL_n = C_{2n-1} + S_1 \times C_{2n} + S_2 \times C_{2(n-1)} \quad \text{[Equation 2]}$$

$$C_0 = 0$$

$$C_{80} = 0$$

In Equation 2, the channel state estimation value of the BLE channel n (i.e., estimated channel low energy, $ECL_n$) may be determined based on channel state information for the BR/EDR channels 2n−1, 2n, and 2 (n−1). For example, the channel state estimate value for BLE channel 2 ($ECL_2$) may be determined as the sum of channel state information value of BR/EDR channel 3 ($C_3$), a value obtained by applying a first scaling factor ($S_1$) to channel state information of BR/EDR channel 4 ($C_4$), and a value obtained by applying a second scaling factor ($S_2$) to channel state information of BR/EDR channel 2 ($CL_2$). This is because one BLE channel in the frequency domain is located at the same center frequency as one BR/EDR channel among the three BR/EDR channels, and corresponds to the frequency position of each part of the remaining two BR/EDR channels, this may mean that the BLE channel state estimation value is determined based on the channel state values of these three BR/EDR channels. In the case of $CL_1$ and $CL_{40}$, since there are only two corresponding BR/EDR channels, it is assumed that $C_0$=0 and $C_{80}$=0.

In the example of FIG. 30, it is assumed that the first network is BLE and the second network is Wi-Fi. $CL_n$ indicates a value (or variable) indicating a channel state for the BLE channel index n, and $CQI_n$ indicates a value (or variable) indicating a channel state for the Wi-Fi channel index n.

In the case of Wi-Fi, there are generally 13 channels in the 2.4 GHz band, the interval between the center frequencies of the channels is 5 MHz, and the width of one channel is generally 20 MHz. Successive Wi-Fi channels may overlap, and mainly one of non-overlapping channels 1, 5, 9, 13 (center frequencies 2412, 2432, 2452, 2472 MHz) is used. The channel state value of each of the 13 channels is defined as $CQI_n$ (n=1, 2, . . . , 13).

The estimated channel state value (i.e., WLAN Estimated Channel, $WEC_n$) of the Wi-Fi channel n may be determined based on the channel state values ($C_L$) of the plurality of BLE channels. For example, since Wi-Fi channel 1 (2412 MHz center frequency channel) corresponds to the positions of BLE channels 1 to 10, $WEC_{-1}$ may be determined as a value obtained by multiplying each of $CL_1$, $CL_2$, . . . , and $CL_{10}$ by an appropriate scaling factor and summing them.

The estimated channel state value ($ECL_n$) of the BLE channel n may be determined as a value obtained by multiplying the state value (CQI) of the corresponding Wi-Fi channel by a predetermined scaling factor. For example, a higher scaling factor value may be applied as it approaches the center frequency of the Wi-Fi channel, and a lower scaling factor value may be applied as it moves away from the center frequency of the Wi-Fi channel.

As such, an estimated channel state value (WEC, ECL, or EC) may be determined based on a conversion table between CQI, which is a channel state value for the Wi-Fi channel, and CL or C, which is a channel state value of BLE or BR/EDR. For example, in the case of frequently used Wi-Fi channels 1, 5, 9, and 13, about three times the value becomes the index of the CL. However, 3 times is only an example, and the scope of the present disclosure is not limited thereto, and a corresponding relationship between a CQI index of one Wi-Fi channel and an index of one or more C or CL may be defined.

For example, one or more channels of another network system (e.g., BLE, BR/EDR, Zigbee, etc.) corresponding to the frequency location and bandwidth of one Wi-Fi channel may be predefined. For example, a correspondence relationship between channels of different network systems may be defined as a matching table. Such a matching table may be used in a process of converting channel state values of one or more first channels of the first network system into channel state values of one or more second channels of a second network system.

In the example of FIG. 31, it is assumed that the values of CQI5 and CQI6, which are channel state values for Wi-Fi channels 5 and 6, are 1, respectively. That is, the energy value detected from the corresponding Wi-Fi channel may mean a state in which the corresponding channel is occupied by another device because it exceeds a predetermined criterion. When the BLE channel state estimation value (ECL) is determined based on the CQI value, a different scaling factor may be applied to each BLE channel.

For example, scaling factors of 0.1, 0.3, and 0.7 may be applied to BLE channels 2, 3, and 4. If the estimated channel state value after scaling is applied is less than 0.5, the corresponding channel may be determined to be used, and if it is greater than or equal to 0.5, the corresponding channel may be determined to be unused. However, these reference values are merely exemplary, and the scope of the present disclosure is not limited thereto. For example, in the example of FIG. 29, when the value of CQI5, which is the channel state value of Wi-Fi channel index 5, is 1, scaling factors of 0, 0.1, 0.3, and 0.7 are applied to the BLE channels $CL_1$, $CL_2$, $CL_3$, and $CL_4$, respectively, and it may be estimated that $ECL_1$=0, $ECL_1$=0.1, $ECL_1$=0.3, and $ECL_1$=0.7. In this case, assuming that the reference value is 0.2, BLE channel index 2 having an ECL value less than 0.2 is determined to be used, and BLE channel indexes 3 and 4 having an ECL value of 0.2 or more may be determined to be unused. In addition, since the value of CQI6, which is the channel state value of the Wi-Fi channel index 6, is 1, the ECL value to which the scaling factor of the BLE channel is applied is estimated based on this, and whether each BLE channel is used based on the estimated ECL value may be determined.

As described above, the Bluetooth device obtains EC or ECL through CSSA and performs AFH using it. In addition, when constructing a channel map based on the estimated channel state value, determining that the corresponding channel is used or not used may be determined according to a predetermined reference value.

That is, based on the second network channel state values measured for one or more second network channels in the second network system (e.g., BR/EDR, Wi-Fi, Zigbee, etc.), the first network channel state value estimated for the specific first network channel in the first network system (e.g., BLE) may be determined. If the determined first network channel state value is equal to or greater than a predetermined reference value, the first network channel is determined to be unused, and if it is less than a predetermined reference value, the first network channel may be determined to be used.

Hereinafter, examples of a digital key security protocol and authentication according to the present disclosure will be described.

Figure 32:
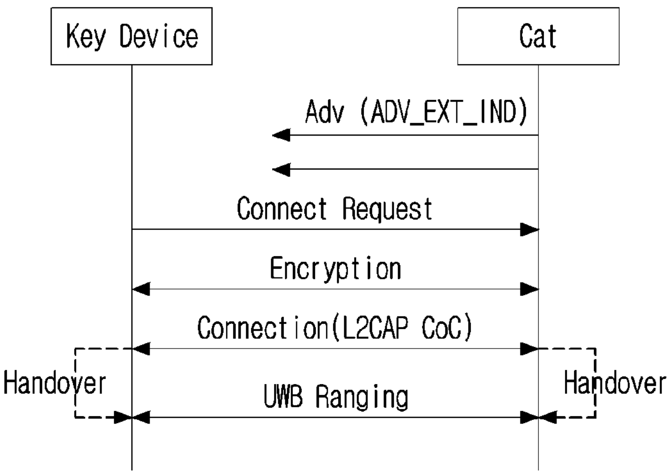
FIG. 32 is a diagram for describing a digital key operation to which the present disclosure may be applied.

FIG. 32 is a diagram for describing a digital key operation to which the present disclosure may be applied.

The key device may discover the advertising device based on the advertising information (e.g., ADV_EXT_IND message) provided from the vehicle. Also, the key device may transmit a connect request message to the discovered advertising device (e.g., vehicle). Accordingly, encryption, connection, and ranging procedures may be performed between the vehicle and the key device. For example, a secure link between the key device and the vehicle may be secured through a connection procedure, and an L2CAP CoC (Logical Link Control and Adaptation Protocol Connection Oriented Channel) link of a BR/EDR or BLE network system may be established for high-speed data exchange. Thereafter, it is handed over to an Ultra-WideBand (UWB) network system, and synchronization may be performed through a UWB ranging procedure, and thus precise positioning may be performed.

In such a digital key technology, for a quick authentication procedure, segmentation or fragmentation of information or packets exchanged through BLE may be considered.

In addition, it may be considered to identify features related to digital key technology and define a key type. The key type will be described in detail with reference to FIG. 35.

In addition, it may be considered to exchange information for digital key connection in an application layer (e.g., GATT) or in a middleware layer (e.g., L2CAP CoC).

In addition, data to be exchanged through BLE may include information for handover and/or key related information.

In addition, key management includes user, multiple vehicles, ID management, and the like, and it is required to define a protocol for this.

In addition, an authentication method for preventing Man-In-The-Middle Attack (MITM) is required.

In addition, an operation (e.g., refresh, activated key, etc.) for managing the key state may be defined.

FIG. 33 is a diagram for describing an example of user registration and management to which the present disclosure may be applied.

For example, a case in which one user is registered in one key device (user A, key device #1), a case in which a plurality of users are registered in one key device (user B and C, key device #2), a case in which one user is registered in a plurality of key devices (user D, key devices #3 and #4), and the like may be supported.

A digital key profile (DK profile) may be generated for each application, or a plurality of applications may share the DK profile. For example, one DK profile corresponding to one key device may be commonly used in a first application corresponding to the first vehicle and a second application corresponding to the second vehicle.

The DK profile may include registration ID (1 byte), registration session number (2 bytes), token (8 bytes or 24 bytes (Message Authentication Code (MAC) applied (MACed)), factor type (2 bytes), and the like.

Here, the factor type may be distinguished according to a method of generating a token. For example, the factor type may indicate basic information used by the key device to generate a token. In addition, the factor type may be configured in the form of a bitmap indicating which of various basic information is available.

For example, the basic information used to generate a token may include at least one of a personal identification number (PIN), password, fingerprint, face, voice, iris, electrocardiogram (ECG), gait, gesture, On-body, liveness, device unlock, finger vein, palm vein, distance bounding, client-defined factor.

For example, a plurality of different tokens may be defined and stored for one ID. In addition, one or more tokens for each of the plurality of IDs may be stored in the token storage.

For example, after performing key exchange with the vehicle, the key device may generate a registration ID and exchange it with the vehicle. In addition, the vehicle may match the registration ID of the key device with the token information, and store and manage the token information in the token storage.

Figure 34:
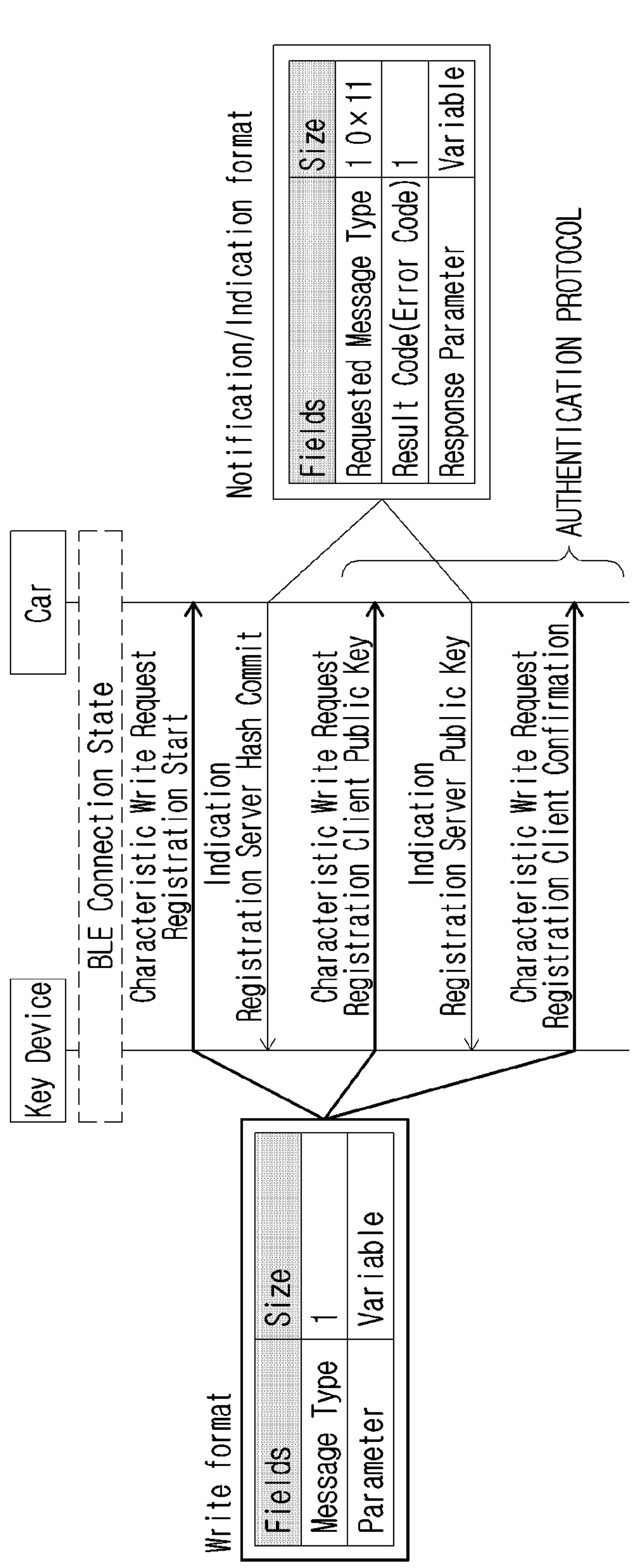
FIG. 34 is a diagram for describing a digital key security protocol and message format to which the present disclosure may be applied.

FIG. 34 is a diagram for describing a digital key security protocol and message format to which the present disclosure may be applied.

When the key device and the vehicle are in a BLE connection state, the key device may transmit a feature write request message to the vehicle, and the vehicle may transmit a notification or indication message to the key device. The format of the write request message may include a message type field and a parameter field. The format of the notification or indication message may include a requested message type field, a result code (or error code) field, and a response parameter field.

For example, the key device may transmit a write request message for registration start to the vehicle. The registration start message may correspond to a message in which the key device requests the vehicle to start the registration procedure. In response, the vehicle may transmit an indication message for registration server hash commit to the key device. The registration server hash execution message may correspond to a message informing whether the server has succeeded in message authentication. If the start message is authenticated, then an authentication protocol between the key device and the vehicle may be performed.

For example, the authentication protocol may include the key device transmitting a write request message for the registration client public key to the vehicle, which may correspond to a message conveying the public key of the key device to the vehicle. Subsequently, the vehicle may transmit an instruction message for the registration server public key to the key device, which may correspond to a message for transferring the public key of the vehicle to the key device. Subsequently, the key device may transmit a write request message for confirming the registered client to the vehicle, which may indicate whether normal authentication is performed, and may correspond to a message confirming whether the key is normal.

Although the example of FIG. 34 shows 0x11 as a value of the message type, this is only exemplary.

FIG. 35 is a diagram for describing a digital key bearer establishment process to which the present disclosure may be applied.

Negotiation for a Maximum Transmission Unit may be performed before performing an authentication protocol between the key device and the vehicle.

When the key device and the vehicle are in a BLE connection state, the key device may transmit an MTU exchange request message to the vehicle. For example, in the MTU exchange request message, an attribute opcode may be configured to 0x02, and an MTU value may be configured to 300 bytes. In response, the vehicle may transmit an MTU exchange response message to the key device. For example, in the MTU exchange response message, the attribute command code may be configured to 0x03, and the MTU value may be configured to 300 bytes. However, 300 bytes is only an exemplary value, and a value smaller or larger than this may be determined through MTU negotiation. For example, when it is necessary to transmit a message having a larger size than the determined MTU value, segmentation or fragmentation is applied to the message, and the message may be divided into messages having an allowed MTU size or smaller.

In addition, when segmentation or fragmentation is supported, exchanged information may be divided into segments of a predetermined size (e.g., 20 bytes) or less. For example, 89-byte information may be divided into four segments of 20 bytes each and one segment of 9 bytes. A segment header and a message authentication code (MAC) may be added to each segment.

In addition, various formats or key types according to ECDH (Elliptic Curve Diffie-Hellman) key exchange, AES-GMAC (Advanced Encryption Standard-Galois Message Authentication Code), AES-GCM (Advanced Encryption Standard-Galois/Counter Mode), and Out-Of-Band (OOB) key schemes may be supported according to the authentication type. Various formats illustrated in FIG. 33 may correspond to formats for supporting segmentation or fragmentation. A specific key type may be identified by a type ID. A key type to be used by the two devices for security may be determined as one of various key types. Various formats including fields corresponding to information necessary for security may be defined according to a determined key type.

Figure 36:
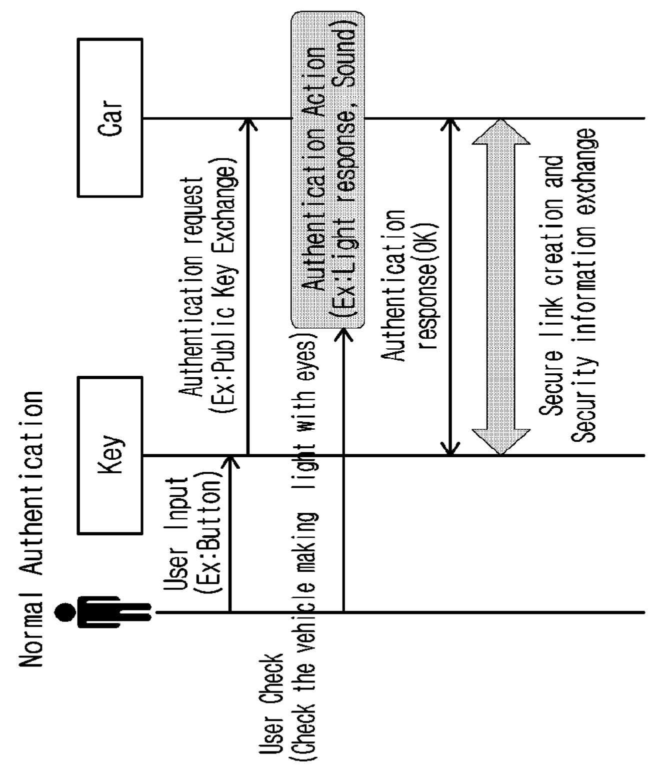
FIG. 36 is a diagram for describing an authentication method to which the present disclosure may be applied.

FIG. 36 is a diagram for describing an authentication method to which the present disclosure may be applied.

The authentication method may include, when the user applies an input (e.g., a button operation) to the key device, the step of the key device sending an authentication request message to the vehicle accordingly. Accordingly, an authentication action (e.g., outputting light and/or sound) is performed in the vehicle, and the user may recognize that authentication is being attempted or being performed by checking this. After that, when the authentication procedure is completed between the key device and the vehicle, and an authentication response including information indicating successful authentication (OK) is finally transmitted from the vehicle to the key device, a secure link is created and security information may be exchanged.

Meanwhile, as the user A applies an input to the key device, the key device may transmit an authentication request message to the user B's vehicle instead of the user A's vehicle. In this case, the user B's vehicle performs an authentication action indicating that authentication is being attempted or is being performed, and accordingly, the user A may recognize that authentication is attempted on the user B's vehicle. An authentication response containing information indicating the failure may then be transmitted from user B's vehicle to the key device.

Meanwhile, an authentication request message by a third party (e.g., a hacking device or a user) may be transmitted to the vehicle of the user A. The user A may detect that an abnormality has occurred by confirming that an authentication attempt or an authentication action being performed is performed in the vehicle of the user A that has not applied an input to the key device. Thereafter, an authentication response including information indicating a failure may be transmitted to a third party.

Figure 37:
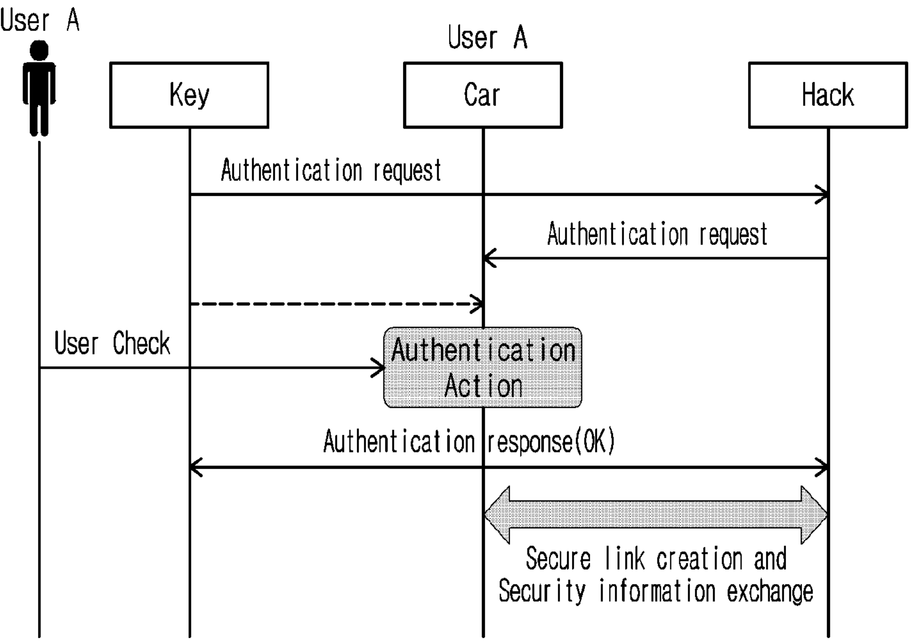
FIG. 37 is a diagram for describing a process of generating an authentication problem to which the present disclosure may be applied.

FIG. 37 is a diagram for describing a process of generating an authentication problem to which the present disclosure may be applied.

The user A may apply an input to the key device to transmit an authentication request message. Such an authentication request message may be delivered to the vehicle of user A, which is the intended destination, but may be delivered to a third party (e.g., a hacking device or a user) or intercepted by a third party on the way. A third party may generate an authentication request message that is duplicated in the same way as a normal authentication request by user A and transmit it to user A's vehicle.

In this case, user A may recognize that normal authentication is being performed through an authentication action indicating that authentication is being attempted or performed in the vehicle. However, in reality, the vehicle may transmit a response message including information indicating success (OK) to each of the key device and a third party with respect to the same authentication message. Accordingly, the vehicle may create a secure link with a third party to exchange security information.

FIG. 38 is a diagram for describing an authentication error solving method to which the present disclosure may be applied.

The first method may include a method of detecting duplicate request/response messages or setting a timer.

For example, when the same authentication request message is received from different entities in the vehicle, the duplicate authentication request message may be detected and treated as an error case. For example, the vehicle may output a signal indicating the duplicate authentication request or transmit an authentication response message including information indicating authentication failure to the device requesting authentication.

In addition, the key device may process a response received during a predetermined timer operation (or between predetermined time intervals) from the time of transmitting the authentication request message as a valid authentication response, and may process a response received when the timer is not running as an invalid authentication response (or before or after a certain time interval).

Also, even when a normal authentication response message is received, the key device may wait until the set timer value expires. If an additional or overlapping authentication response message is received before the timer expires, it may be treated as an error case.

In addition, the authentication request message transmitted from the third-party key device (hack) may be generated to duplicate the authentication request message of the normal key device or to be recognized as the authentication request message from the normal key device. In this case, the vehicle may start a predetermined timer at the time of receiving the first authentication request message from the first key device, and may treat as an error case when a duplicate authentication request message from the same first key device is received during a predetermined timer operation.

The second method may include a method of performing a mutual ranging check between the key device and the vehicle.

For example, when the vehicle receives the authentication request message, a ranging check may be performed on the device that transmitted the authentication request message. Also, the key device may perform a ranging check on the vehicle. Also, the key device and the vehicle may perform a mutual ranging check. If the authentication request from a third party is invalid, the third party does not respond to the ranging check from the vehicle or does not perform the ranging check on the vehicle, so it may be treated as an invalid authentication request. In addition, the ranging check may include performing precise location determination in a manner such as High Accuracy Distance Measurement (HADM), Angle of Arrival (AoA), or the like.

Figure 39:
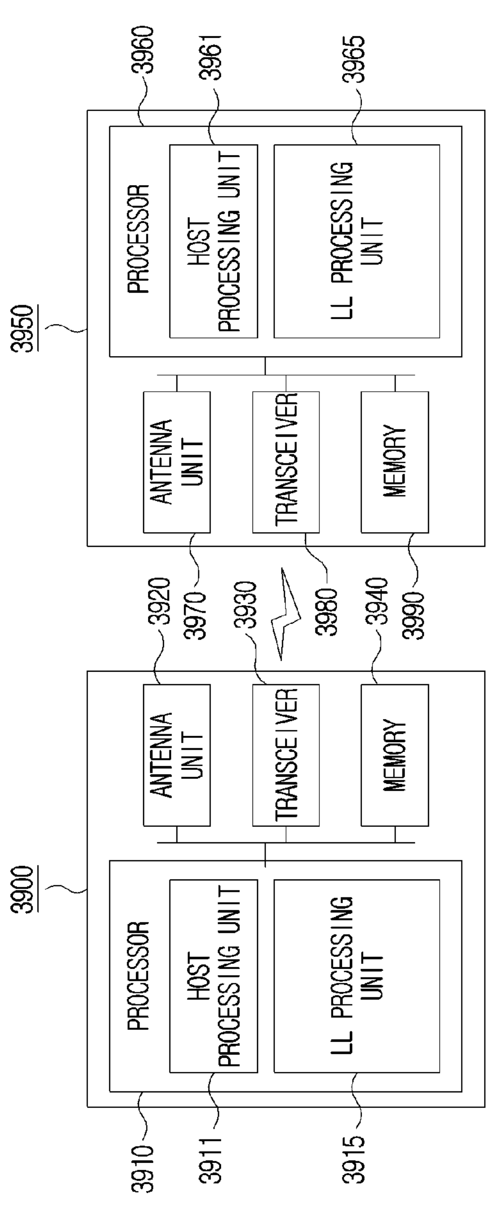
FIG. 39 is a diagram illustrating a configuration of a first device and a second device to which the present disclosure may be applied.

FIG. 39 is a diagram illustrating a configuration of the first device and the second device to which the present disclosure is applicable.

The first device 3900 may include a processor 3910, an antenna unit 3920, a transceiver 3930, and a memory 3940.

The processor 3910 may perform baseband-related signal processing and may include a host processor 3911 and a controller processor 3915. The host processor 3911 and the controller processor 3915 may exchange information through HCl. The host processor 3911 may process operations such as L2CAP, ATT, GATT, GAP, and LE profile layers. The controller processor 3915 may process operations such as LL and PHY layers. The processor 3910 may control the overall operation of the first device 3900 in addition to performing baseband-related signal processing.

Antenna unit 3920 may include one or more physical antennas. The transceiver 3930 may include RF (Radio Frequency) transmitter and RF receiver. The memory 3940 may store information processed by the processor 3910 and software, an operating system, and an application related to the operation of the first device 3900, and may include components such as a buffer and the like.

The processor 3910 of the first device 3900 may be configured to implement an operation of the first device (or, master device) in the embodiments described in the present disclosure.

For example, the LL processing unit 3915 of the processor 3910 of the first device 3900 may instruct the LL processing unit 3965 of the second device 3950 whether to enable the channel classification report.

The LL processing unit 3915 of the first device may receive the channel classification report from the LL processing unit 3965 of the second device.

The LL processing unit 3915 of the first device may determine a channel map based on at least one of channel sensing result by the LL processing unit 3915, the channel classification report received from the LL processing unit 3965 of the second device, or information provided from the host processing unit 3911.

The LL processing unit 3915 of the first device may provide the determined channel map to the LL processing unit 3965 of the second device.

The second device 3950 may include a processor 3960, an antenna unit 3970, transceiver 3980, and a memory 3990.

The processor 3960 may perform baseband-related signal processing and may include a host processor 3961 and a controller processor 3965. The host processor 3961 and the controller processor 3965 may exchange information through HCl. The host processor 3961 may process operations such as L2CAP, ATT, GATT, GAP, and LE profile layers. The controller processor 3965 may process operations of the LL layer, the PHY layer, and the like. The processor 3960 may control the overall operation of the second device 3960 in addition to performing baseband-related signal processing.

The antenna unit 3970 may include one or more physical antennas. The transceiver 3980 may include an RF transmitter and an RF receiver. The memory 3990 may store information processed by the processor 3960 and software, an operating system, and an application related to the operation of the second device 3950, and may include components such as a buffer and the like.

The processor 3960 of the second terminal device 3950 may be configured to implement the operation of the second device (or the slave device) in the embodiments described in the present disclosure.

For example, the LL processing unit 3965 of the processor 3960 of the second device 3950 may receive whether the channel classification report is enabled from the LL processing unit 3915 of the first device. When channel classification reporting is enabled, the LL processing unit 3965 of the second device may generate a channel classification result based on one or more of information provided from the host processing unit 3961 or a channel sensing result performed by the LL processing unit 3965. The generated channel classification result may be reported from the LL processing unit 3965 of the second device to the LL processing unit 3915 of the first device.

The LL processing unit 3955 of the second device may receive the channel map from the LL processing unit 3915 of the first device.

In the operation of the first device 3900 and the second device 3950, the descriptions of the first device (or master device) and the second device (or slave device) in the examples of the present disclosure may be equally applied, and overlapping descriptions are omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor (s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/ containers.

INDUSTRIAL APPLICABILITY

Embodiments of the present disclosure may be applied to various wireless communication systems to increase the performance of the wireless communication system.

The invention claimed is:

1. A method for a first device of a wireless communication system to select a channel, the method comprising:

transmitting, by the first device to a second device, a first protocol data unit (PDU) including information indicating an enabling or disabling of a reporting of channel classification information;

receiving, by the first device from the second device, a first link layer (LL) acknowledgement of the first PDU, wherein a procedure of the enabling or disabling of the reporting of the channel classification information has completed when the first LL acknowledgement of the first PDU is received;

receiving a second PDU including a channel classification report from the second device after the channel classification report has been enabled by the first device based on the information indicating the enabling of the reporting of the channel classification information;

transmitting, to the second device, a second LL acknowledgement of the second PDU, wherein a procedure of the channel classification report has completed when the second LL acknowledgement of the second PDU is transmitted; and determining a channel map based on at least one of the channel classification report, a channel sensing result of the first device, or information provided from a host of the first device, wherein the second PDU is not transmitted by the second device to the first device based on the information indicating the disabling of the reporting of the channel classification information.

2. The method of claim 1, wherein:

the channel classification report includes a channel state based on at least one of a channel sensing in a LL of the second device, or information provided from a host of the second device.

3. The method of claim 2, wherein:

the channel state includes good, bad, or unknown.

4. The method of claim 1, wherein:

the first PDU is transmitted from the LL of the first device to the LL of the second device.

5. The method of claim 1, wherein:

the second PDU is transmitted from the LL of the second device to the LL of the first device.

6. The method of claim 1, wherein:

the channel map determined by the first device is provided to the second device.

7. The method of claim 1, wherein:

a frequency hopping pattern is applied based on the channel map.

8. The method of claim 1, wherein:

the channel map indicates whether each of one or more channels is used.

9. The method of claim 1, wherein:

the first device is a master device or a central device, and the second device is a slave device or a peripheral device.

10. An apparatus on a side of a first device that performs channel selection in a wireless communication system, the apparatus comprising:

a transceiver for performing signal transmission and reception with a second device; and a processor for controlling the transceiver and the apparatus, wherein the processor is configured to:

transmit, to the second device through the transceiver, a first protocol data unit (PDU) including information indicating an enabling or disabling of a reporting of channel classification information;

receive, from the second device through the transceiver, a first link layer (LL) acknowledgement of the first PDU, wherein a procedure of the enabling or disabling of the reporting of the channel classification information has completed when the first LL acknowledgement of the first PDU is received;

receive a second PDU including a channel classification report from the second device through the transceiver after the channel classification report has been enabled by the first device based on the information indicating the enabling of the reporting of the channel classification information;

transmit, to the second device through the transceiver, a second LL acknowledgement of the second PDU, wherein a procedure of the channel classification report has completed when the second LL acknowledgement of the second PDU is transmitted; and determine a channel map based on at least one of the channel classification report, a channel sensing result of the first device, or information provided from a host of the first device, wherein the second PDU is not transmitted by the second device to the first device based on the information indicating the disabling of the reporting of the channel classification information.

* * * * *